US010599684B2

(12) United States Patent
Bolcer et al.

(10) Patent No.: US 10,599,684 B2
(45) Date of Patent: *Mar. 24, 2020

(54) DATA RELATIONSHIPS STORAGE PLATFORM

(71) Applicant: Bitvore Corp., Los Angeles, CA (US)

(72) Inventors: Greg Bolcer, Los Angeles, CA (US); Alan Chaney, Los Angeles, CA (US); Clay Cover, Los Angeles, CA (US)

(73) Assignee: Bitvore Corp., Los Angeles, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/412,735

(22) Filed: Jan. 23, 2017

(65) Prior Publication Data

US 2017/0132310 A1    May 11, 2017
US 2018/0165353 A9    Jun. 14, 2018

Related U.S. Application Data

(63) Continuation of application No. 13/971,163, filed on Aug. 20, 2013, now Pat. No. 9,594,823.

(Continued)

(51) Int. Cl.
    *G06F 17/30*       (2006.01)
    *G06F 16/28*       (2019.01)
              (Continued)

(52) U.S. Cl.
    CPC .............. *G06F 16/288* (2019.01); *G06F 7/08* (2013.01); *G06F 16/22* (2019.01);
              (Continued)

(58) Field of Classification Search
    CPC ......... G06F 17/30345; G06F 17/30566; G06F 17/30613; G06F 17/30861;
              (Continued)

(56) References Cited

U.S. PATENT DOCUMENTS 6,078,924 A      6/2000   Ainsbury et al.
7,043,476 B2 *   5/2006   Robson ................. G06F 16/284

(Continued)

OTHER PUBLICATIONS

Int'l Search Report and the Written Opinion Appln PCT/US2013/055759, dated Mar. 28, 2014.

(Continued)

*Primary Examiner* — Jean M Corrielus
(74) *Attorney, Agent, or Firm* — McAndrews, Held & Malloy, Ltd.

(57) ABSTRACT

A data relationships storage platform for analysis of one or more data sources is described herein. A data processing system may be communicatively coupled to one or more data sources and one or more big-data databases. One or more collectors may collect data pieces from the one or more data sources. One or more analyzer may analyze the collected data pieces to determine whether one or more relationships exist between the collected data pieces. The analysis results in one or more data globs that include one or more of the data pieces and relationship information, such as tags. The tagged data globs may be communicated to and stored in one or more big-data databases.

20 Claims, 10 Drawing Sheets

Related U.S. Application Data

(60) Provisional application No. 61/691,917, filed on Aug. 22, 2012, provisional application No. 61/714,902, filed on Oct. 17, 2012, provisional application No. 61/784,265, filed on Mar. 14, 2013.

(51) Int. Cl.
*G06F 16/22* (2019.01)
*G06F 16/25* (2019.01)
*G06F 16/951* (2019.01)
*G06F 16/23* (2019.01)
*G06F 7/08* (2006.01)
*G06F 16/95* (2019.01)

(52) U.S. Cl.
CPC .......... *G06F 16/2365* (2019.01); *G06F 16/25* (2019.01); *G06F 16/284* (2019.01); *G06F 16/951* (2019.01); *G06F 16/95* (2019.01)

(58) Field of Classification Search
CPC ......... G06F 17/30557; G06F 17/30595; G06F 17/30696; G06F 17/30604; G06F 17/30864; G06F 17/30371; G06F 17/30312; G06F 16/288; G06F 16/25
USPC ......................................... 707/749, 736, 692
See application file for complete search history.

(56) References Cited

U.S. PATENT DOCUMENTS

| | | | |
|---|---|---|---|
| 7,092,956 B2 | 8/2006 | Ruediger | |
| 7,908,360 B2* | 3/2011 | Gach | G05B 19/4185 709/224 |
| 8,386,499 B2 | 2/2013 | Martinez et al. | |
| 8,458,224 B2* | 6/2013 | Rashad | G06F 17/30539 707/802 |
| 8,554,724 B2* | 10/2013 | Zunger | G06F 16/27 707/609 |
| 8,554,794 B2* | 10/2013 | Brydon | G06Q 10/107 707/785 |
| 8,612,439 B2* | 12/2013 | Prahlad | G06F 16/1844 707/736 |
| 8,983,912 B1 | 3/2015 | Beedgen et al. | |
| 9,081,855 B1* | 7/2015 | Abeloe | G06F 17/3079 |
| 9,123,006 B2* | 9/2015 | Carter | G06Q 10/063 |
| 9,141,628 B1 | 9/2015 | Zimmermann et al. | |
| 9,171,008 B2* | 10/2015 | Prahlad | G06F 16/1844 |
| 9,262,519 B1* | 2/2016 | Saurabh | G06F 17/3071 |
| 9,454,537 B2* | 9/2016 | Prahlad | G06F 16/1844 |
| 9,578,060 B1* | 2/2017 | Brisebois | H04L 63/20 |
| 9,594,823 B2 | 3/2017 | Chaney et al. | |
| 9,824,082 B2* | 11/2017 | Agrawal | G06F 17/30286 |
| 2006/0229931 A1* | 10/2006 | Fligler | G06Q 30/02 705/7.38 |
| 2006/0253418 A1* | 11/2006 | Charnock | G06F 17/30716 |
| 2007/0198328 A1* | 8/2007 | Fuller | G06F 17/30398 711/170 |
| 2007/0294281 A1* | 12/2007 | Ward | G06Q 30/02 |
| 2008/0140684 A1* | 6/2008 | O'Reilly | G06F 16/353 |
| 2008/0249981 A1 | 10/2008 | Norring et al. | |
| 2009/0089226 A1* | 4/2009 | Bradford | H04L 41/0631 706/12 |
| 2009/0089233 A1* | 4/2009 | Gach | G05B 19/4185 706/45 |
| 2009/0193001 A1 | 7/2009 | Boris et al. | |
| 2009/0248738 A1 | 10/2009 | Martinez et al. | |
| 2009/0319518 A1 | 12/2009 | Koudas et al. | |
| 2009/0319537 A1* | 12/2009 | Westerfeld | G06Q 10/10 |
| 2010/0010968 A1* | 1/2010 | Redlich | G06Q 10/00 707/E17.014 |
| 2010/0161662 A1* | 6/2010 | Jonas | G06F 17/30539 707/780 |
| 2011/0040805 A1* | 2/2011 | Carter | G06Q 10/063 707/808 |
| 2011/0093430 A1 | 4/2011 | B'Far et al. | |
| 2011/0218990 A1* | 9/2011 | Jordahl | G06F 17/30601 707/723 |
| 2011/0252134 A1* | 10/2011 | Villeneuve | G06F 17/30398 709/224 |
| 2011/0282860 A1 | 11/2011 | Baarman et al. | |
| 2012/0016901 A1 | 1/2012 | Agarwal et al. | |
| 2012/0150888 A1* | 6/2012 | Hyatt | G06F 16/335 707/758 |
| 2012/0197907 A1 | 8/2012 | Malyshev et al. | |
| 2012/0239763 A1 | 9/2012 | Musil | |
| 2012/0290672 A1 | 11/2012 | Robinson et al. | |
| 2012/0317155 A1 | 12/2012 | Ogasawara et al. | |
| 2013/0103667 A1 | 4/2013 | Minh | |
| 2013/0231975 A1 | 9/2013 | High et al. | |
| 2014/0006338 A1* | 1/2014 | Watson | G06F 17/30563 707/602 |
| 2014/0289530 A1 | 9/2014 | De Waal et al. | |
| 2016/0034588 A1* | 2/2016 | Hyatt | G06F 16/335 707/733 |

OTHER PUBLICATIONS

Int'l Search Report and the Written Opinion Appln PCT/US2013/055759, dated Mar. 5, 2015.
Yang et al. Near-Duplicate Detection by Instance-level Constrained Clustering, 2006, SIGIR '06 Proceedings of the 29th Annual International AMC SIGIR Conference on Research and Development in Information Retrieval, pp. 421-428.
Proffitt, What Hadoop can, and can't do, Jun. 2012, ITworld.
White, Hadoop: The Definitive Guide, May 2012, O'Reilley, Third Ed.

* cited by examiner

DATA RELATIONSHIPS STORAGE PLATFORM

CROSS-REFERENCE TO RELATED APPLICATIONS/INCORPORATION BY REFERENCE

This application is a continuation patent application of U.S. patent application Ser. No. 13/971,163, filed Aug. 20, 2013, which claims priority to U.S. provisional patent application No. 61/691,917, filed Aug. 22, 2012; U.S. provisional patent application No. 61/714,902, filed Oct. 17, 2012; and U.S. provisional patent application No. 61/784,265, filed Mar. 14, 2013. The above-referenced United States patent applications are all hereby incorporated herein by reference in their entirety.

FIELD

The invention relates to the field of large scale data management. In particular, but not exclusively, it relates to automated analysis of data that may be stored in a decentralized manner.

BACKGROUND

With the growth of the use of the Internet, the growth of data usage in private networks and the growth of data used by companies and other entities, both internal and external data, the need for massive data storage and massive computing power has risen. Therefore, many entities are turning to cloud computing. The terms "the cloud" or "cloud computing" may refer generally to large scale data centers that are maintained by a third party, or a company or entity, for example one that maintains systems and/or software that work with the data center(s), where the storage and computing capabilities of the numerous servers within the data center are offered to internal or external customers through one or more network connections. Because relatively small entities may have access to the large scale storage and computing power of many servers, the entities can have access to large-scale computing power that is flexible and available while lowering or eliminating the costs needed to maintain the data centers. Various databases, such as communications databases and/or databases in a cloud computing data center, may be useful for storing massive amounts of data, but in various database approaches, the data is stored in a decentralized manner, across several servers or nodes, and information regarding the relationships or correlations between the data may not be stored. In various databases, for example, communications databases and/or other forms of databases, large-scale data is formatted or structured to be most easily used for task-specific computations. In other words, data may be analyzed at the outset, for example a particular relationship may be analyzed, and then the data and the resulting conclusion are stored in a specific format. For various databases, this is called a schema. Once the initial analysis is done, it may be very time consuming and difficult to re-structure and/or re-analyze data to find a new value, short of retrieving, harvesting and/or archiving locally all the data the user is interested and then organizing and/or performing computations or routines on the data to analyze relationships.

Data has become a key asset for most modern day enterprises. Managing this data has become a major problem for the IT departments of these companies and organizations. For many years, the changes in business requirements have made it more and more difficult and expensive for enterprises to keep abreast of the changes in data—firstly, because of continuous changes in the tools and standards, and secondly because of the exponential increase in the amount of data that is being made available.

Enterprises may find it difficult to detect business value in the relationships between data points, where many different types of data exist. Trying to convert data to a heterogeneous but flexible format may likely result in incomplete information that is collected from limited points.

Further limitations and disadvantages of conventional and traditional approaches will become apparent to one of skill in the art, through comparison of such systems with the present invention as set forth in the remainder of the present application with reference to the drawings.

BRIEF SUMMARY

Aspects of the present invention are aimed at reducing or eliminating the above problems with the prior art. In particular, but not exclusively, aspects of the invention are directed to large scale data management and automated analysis of data that may be stored in a decentralized manner.

One example embodiment of this invention comprises a data relationships storage platform, comprising a data processing system communicatively coupled to one or more data sources and one or more big-data databases. The data processing system may be programmed to: collect data pieces from the one or more data sources; analyze the collected data pieces to determine whether one or more relationships exist between the collected data pieces; create one or more data globs that include one or more of the data pieces and relationship information; and communicate one or more data globs to the one or more big-data databases so that the big-data databases can store the data globs.

In another example embodiment of this invention, the data relationships storage platform may include one or more collector modules, one or more analyzer modules, and one or more data services. The collector modules perform the collecting. A collector module is designated to collect data pieces from one or more data sources. The analyzer modules perform the analyzing and the creation of the data globs. The analyzer modules use an intensity algorithm to determine the degree of correlation between data pieces. The data services manage the communication of the data globs to the big-data databases.

In another example embodiment of this invention, the one or more collectors may each de-normalize the data pieces they collect.

In another example embodiment of this invention, the data processing system may include a statistics module that tracks one or more of the following: number of collectors, number of data pieces received, and/or number of data globs created.

In another example embodiment of this invention, the one or more analyzers may each tag incoming data pieces to aid in later searching of the big-data databases.

In another example embodiment of this invention, the relationships between data may include one or more of: hierarchical, network, relational, entity-relationship, anchor model, dimensional, multi-value, object and key-value.

In another example embodiment of this invention, each data piece may represent a message with one or more of the following fields: source, sender, timestamp, subject, intended recipients, actual recipients and metadata.

In another example embodiment of this invention, each data piece may be associated with one or more profiles, where each profile may be a sender, a recipient and/or an observer.

In another example embodiment of this invention, the data processing system may be programmed to identify related source-profiles in order to determine a single profile for each unique person and/or entity.

In another example embodiment of this invention, the data processing system may be programmed to deduplicate collected data pieces according to a level of similarity the collected data pieces have with stored information associated with one or more data globs.

In another example embodiment of this invention, the relationship information may comprise one or more editable tags, each tag is designated as being visible to a single user, visible to several users, or visible throughout a domain.

BRIEF DESCRIPTION OF SEVERAL VIEWS OF THE DRAWINGS

The invention will now be described in greater detail with reference to accompanying figures, in which.

DETAILED DESCRIPTION

Figure 1:
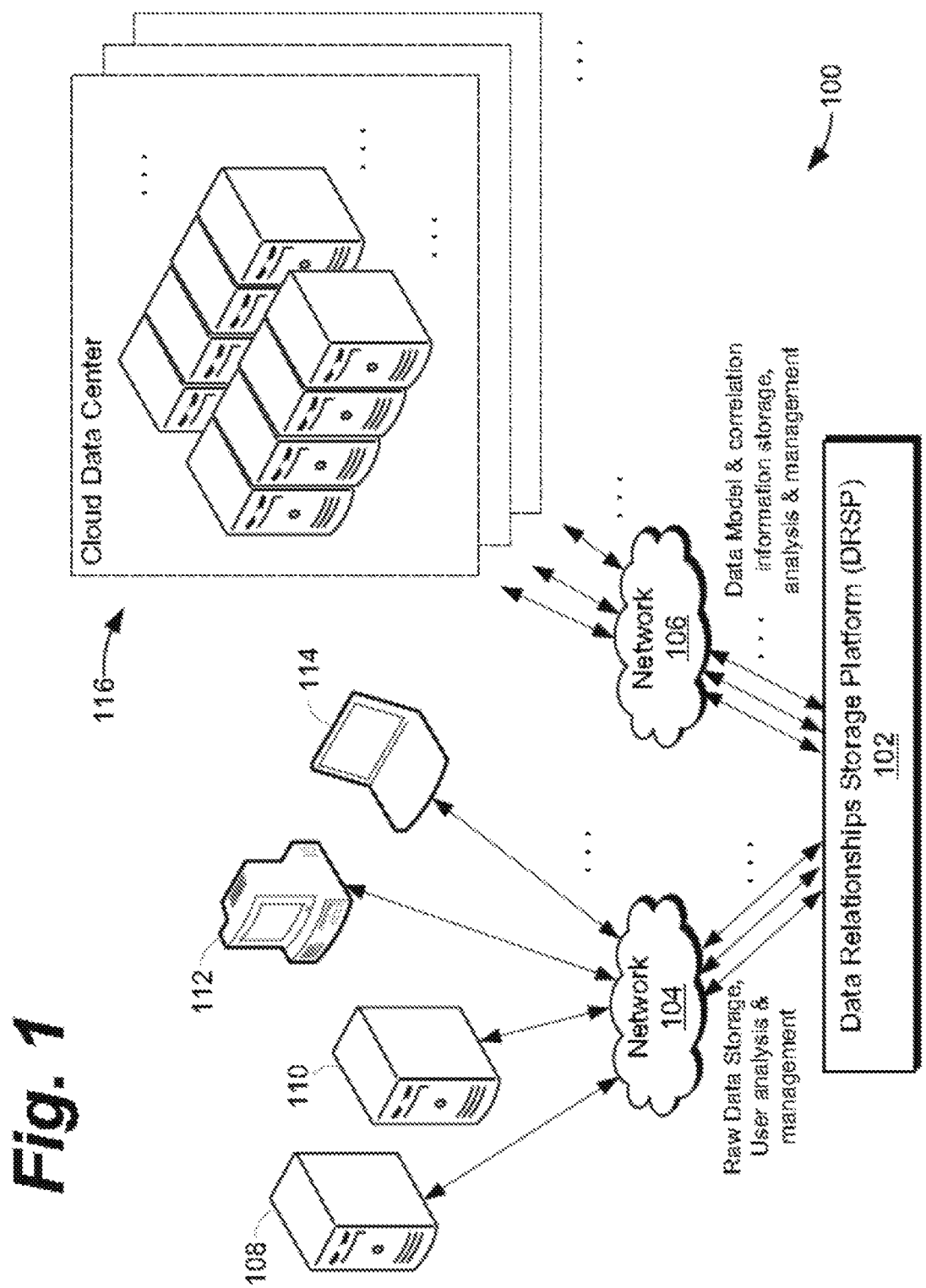
FIG. 1 is an example illustration of a network that comprises an embodiment of the present invention.

The present disclosure describes one or more systems, methods, routines, techniques and/or tools for a Data Relationships Storage Platform (DRSP). The DRSP may provide benefits of cloud computing while preserving valuable information. The DRSP may determine and/or analyze relationships or correlations between data and may save this correlation information when the data is stored to a database, and/or at a later point in time after the data is stored, for example, a communications database and/or other database for other form(s) of data. The DRSP may reconstruct data in various ways that are useful to an entity, for example a company, and various relationships between the data that are useful to the entity may be determined, for example according to strengths, weaknesses, opportunities, and threats of and to the entity within and across the data. Saving the correlation information and/or other information may also be referred to as mapping the information to the database, for example, a communications database and/or other database for other form(s) of data. Correlation information may refer generally to information that indicates how one or more pieces of data relate to each other. One example of correlation information, using an example of data within a communications database, may be the relationship between individual messages within an email thread or a social media thread.

The DRSP may allow users to quickly explore, analyze, manipulate and interact with stored data and correlation information, for example, in real time and receiving quick responses. One benefit of the DRSP may be that, because relationships between data are stored in addition to the data, and because new relationships can be discovered or generated at a later time, users may explore relationships between data on the fly, for example, relationships that the user may not have intended to explore when they saved the data. The DRSP may create an agile-style data model (e.g., referred to as "Data Modeling") that allows dynamic analysis of data, where the data and relationships may be kept live and readily accessible by users. The DRSP may offer benefits over other various database approaches that may require a user to retrieve, harvest and/or archive all the data the user is interested in from the database, for example, a communications database and/or other database for other form(s) of data, and then organize and/or perform integrations, computations, formulas and/or routines on the data to analyze relationships or other aspects of the data. The DRSP may allow users to re-use relationship and other information about the data in various ways without having to re-create data relationship sets. The DRSP may provide data management and analysis capabilities similar to those offered by various relational databases, while offering the power and flexibility of non-relational databases and other forms of databases often found in cloud computing (e.g. referred to as "Asynchronous Analysis"). The DRSP may allow applications that are built around relational databases to continue running like normal (i.e. as the application may normally run on a relational database) while still taking advantage of cloud computing. The DRSP may integrate with various sorts of internal and external enterprise data and systems, and those data and systems of other entities.

FIG. 1 depicts an illustration of a block diagram showing example components, connections and interactions of a network setup 100 where one or more example embodiments of the present disclosure may be useful in such a network setup. It should be understood that the network setup 100 may include additional or fewer components, connections and interactions than are shown in FIG. 1. FIG. 1 focuses on a portion of what is typically a much larger network of components, connections and interactions. Network setup 100 may include a data relationships storage platform (DRSP) 102, according to one or more embodiments of the present disclosure. Network setup 100 may include one or more networks 104, 106, one or more source devices (for example, source devices 108, 110, 112, 114) and one or more cloud data centers 116. It should be understood that although various descriptions and/or drawings herein may refer to cloud data centers as one example of a database, one or more systems, methods, routines, techniques and/or tools described herein may apply to other databases, for example, communications databases and/or other forms of data bases, that store data in a distributed manner.

Source devices 108, 110, 112, 114 may be examples of various devices within an entity or enterprise that create and manage large amounts of various forms of data, for example, both structured and unstructured data (e.g., unstructured data such as email, social media, text, documents, Web content, and structured data such as server logs, phone logs, customer service logs, etc.). In some embodiments, source devices may be examples of various internal and/or external sources that an entity or enterprise is interested in, for example, various email and messaging databases and/or various social networking services. Source devices may be in communication with each other and/or a data relationship storage platform (DRSP) 102 via a network 104. The DRSP 102 may be in communication with one or more cloud data centers 116 via a network 106. Network 106 may be the same general collection of network connections as network 104, or it may be separate. It should be understood that although FIG. 1 shows the DRSP 102 as being separated from the source devices and cloud data centers via networks, other configurations are contemplated. For example, the DRSP 102 may be integrated with one or more cloud data centers, and/or the DRSP 102 may be part of a local network with one or more source devices. In some embodiments, the DRSP may be configured in a distributed fashion to perform data correlation and analysis with respect to one or more source devices.

In operation, source devices (source devices 108, 110, 112, 114) create and/or store large amounts of data. Various source devices may initiate storage of data to one or more cloud data centers 116 or connections databases. Additionally, various source devices, for example social networking services, may store data that is accessed by a separate device that initiates storage of the data to one or more cloud data centers 116 or connections databases. The DRSP 102 may collect and analyze the data from the source devices, for example, before the data is stored to the cloud data centers 116 or connections databases. The DRSP may determine and/or analyze relationships or correlations between data and may save this correlation information when the data is stored to a database, for example, a communications database and/or other form(s) of database(s).

Figure 2:
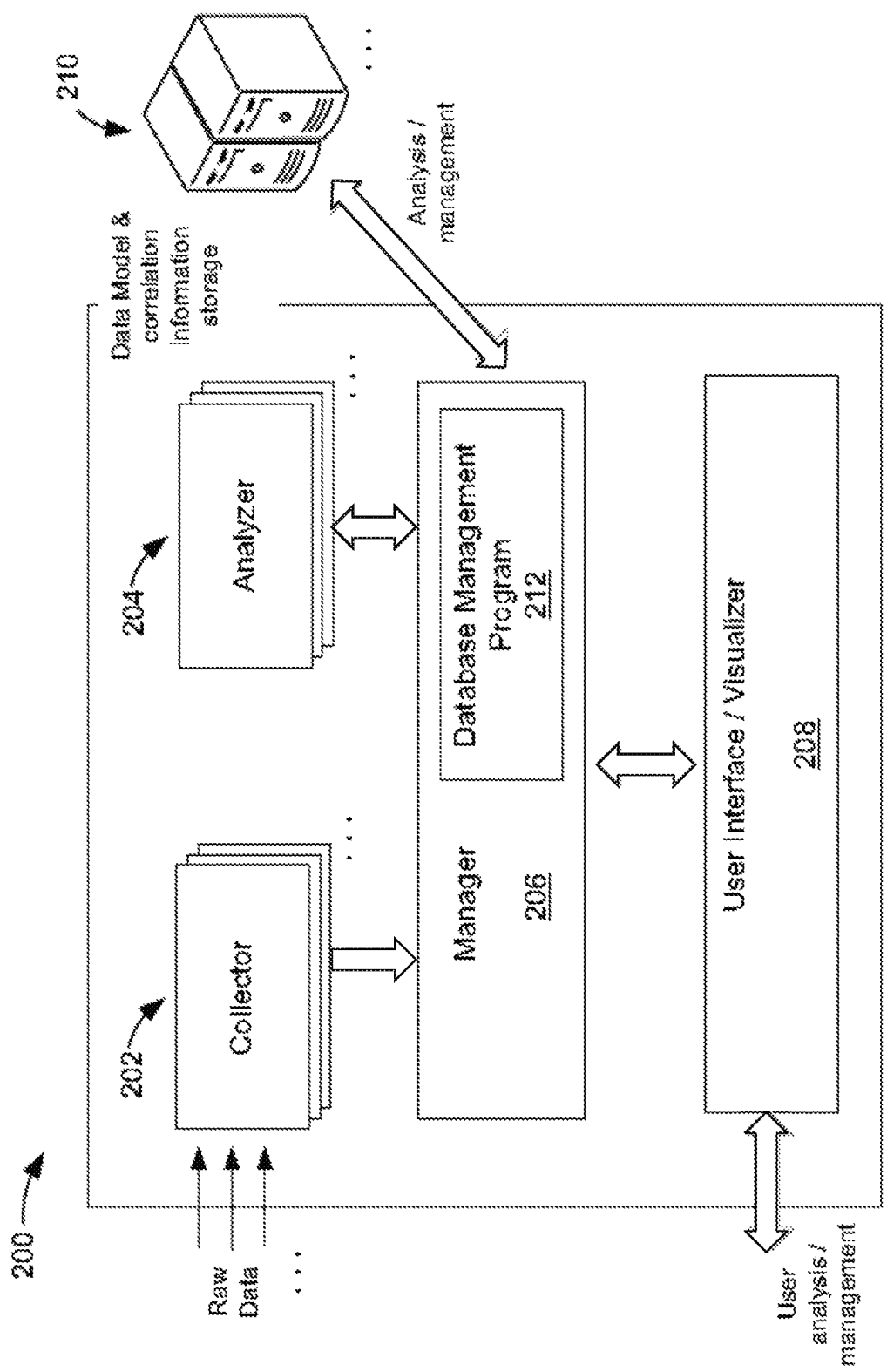
FIG. 2 is a block diagram of a data relationships storage platform (DRSP) according to one or more example embodiments of the present invention.

FIG. 2 depicts an illustration of a block diagram showing example components, connections and interactions of a data relationships storage platform (DRSP) 200, according to one or more example embodiments of the present disclosure. The DRSP 200 may include one or more collectors 202, one or more analyzers 204, a manager 206 and a user interface and visualizer 208. In some embodiments, the one or more collectors 202, one or more analyzers 204, the manager 206 and/or the user interface and visualizer 208 may be referred to as "data primitives," for example because they act on or perform operations with respect to data or raw data. The DRSP 200 may allow a user or administrator to dynamically add or remove collectors, analyzers and/or other components to the DRSP, for example without stopping or rebooting the DRSP. The DRSP 200 may be in communication with one or more databases 210, for example, communications databases and/or other form(s) of databases. The database(s) 210, for example communications databases and/or other form(s) of database(s), may be similar to the cloud data center(s) 116 of FIG. 1. In some embodiments of the present disclosure, the database(s) 210 or cloud data centers may be included within the DRSP 200.

The collector(s) 202 accept data from multiple sources, for example, source devices similar to source devices 108, 110, 112, 114 shown in FIG. 1. Collector(s) 202 may organize raw data from multiple sources and present data to one or more analyzers 204 in a useful format.

The analyzer(s) 204 may accept data from the collector(s) 202, and may analyze the data and/or compare the data to other data to determine relationships between data and/or within data. The analyzer(s) 204 may execute and/or use one or more correlation intensity algorithms to analyze the data. A correlation intensity algorithm may determine the degree of correlation between pieces of data. For example, data may be strongly correlated, loosely correlated or not correlated. A correlation intensity algorithm may determine the degree of correlation between pieces of data with or without referencing the content of the data.

The analyzer(s) 204 may use one or more algorithms to assemble subsets or new groupings of the data in various ways and/or to associate data according to different relationships or correlations. The analyzer(s) 204 may slice and/or correlate data in ways that are important to an entity, for example, to deal with strengths, weaknesses, opportunities, and threats across the company. In various embodiments of the present disclosure, the analyzer(s) 204 may analyze data for relationships including, but not limited to, the following: time, content, keywords, associated users or profiles, and sentiment. Non-textual data may be similarly stored and analyzed with the system. In some embodiments, the analyzer(s) 204 may analyze data to determine, for example, which employees in an enterprise are talking to which customers, and, optionally, what subjects they are discussing. In some embodiments, the analyzer(s) 204 may analyze data to look for and correlate different types of business data, for example server logs and sales data could be correlated with engineer and/or marketing data. As another example, public data (i.e., data from external sources such as social networking services) may be correlated with private data (i.e., server logs and internal email messages). As another example, data from a particular type of source (e.g., company email) may be correlated (same-source correlation). As another example, data from multiple sources (e.g., company email, social networking services, news feeds, and server logs) may be correlated (cross-source correlation).

A correlation intensity algorithm may utilize one or more characteristics and/or metrics to determine the intensity of correlation between data. The algorithm may assign weights, for example based on user input, to characteristics and/or metrics, where the weights may indicate how important a particular characteristic and/or metrics is to the correlation determination. Characteristics or metrics may allow a correlation intensity algorithm to flexibly evaluate correlations across many different dimensions of the data. Characteristics or metrics may be normalized, for example, to a range between 0 and 1 inclusively or between −1 and 1. Normalization may allow characteristics or metrics to be combined with user-provided weightings, for example, to generate a single composite weight on the fly. The following may be example characteristics or metrics used by correlation intensity algorithms: data chunk length (e.g., all messages in a thread or a parallel metric in the case of structured data such as server logs), number of data pieces in a data chunk (e.g., number of messages in a thread or similar metric in the case of structured data such as server logs), number of users associated with a data chunk (e.g., number of participants in a message thread), average data chunk length (e.g., average message length of message in a thread), entropy score (a measure of how complex or unique the contents of the data chunk are) (e.g., the combined entropy score of all messages in thread), spam score (e.g., a spam score for each message in a thread), readability score that indicates the approximate grade level of the text in the data chunk, readability score indicating the number of years of education needed for comprehension of the text in the data chunk, the number of unique concepts (e.g., the number of unique concepts in a thread, for example, as determined by a search and/or analysis engine), average sentiment score (e.g., the average sentiment score of messages, for example, as calculated by a search and/or analysis engine) and/or concept density (e.g., unique concepts divided by length of a thread).

Figure 3:
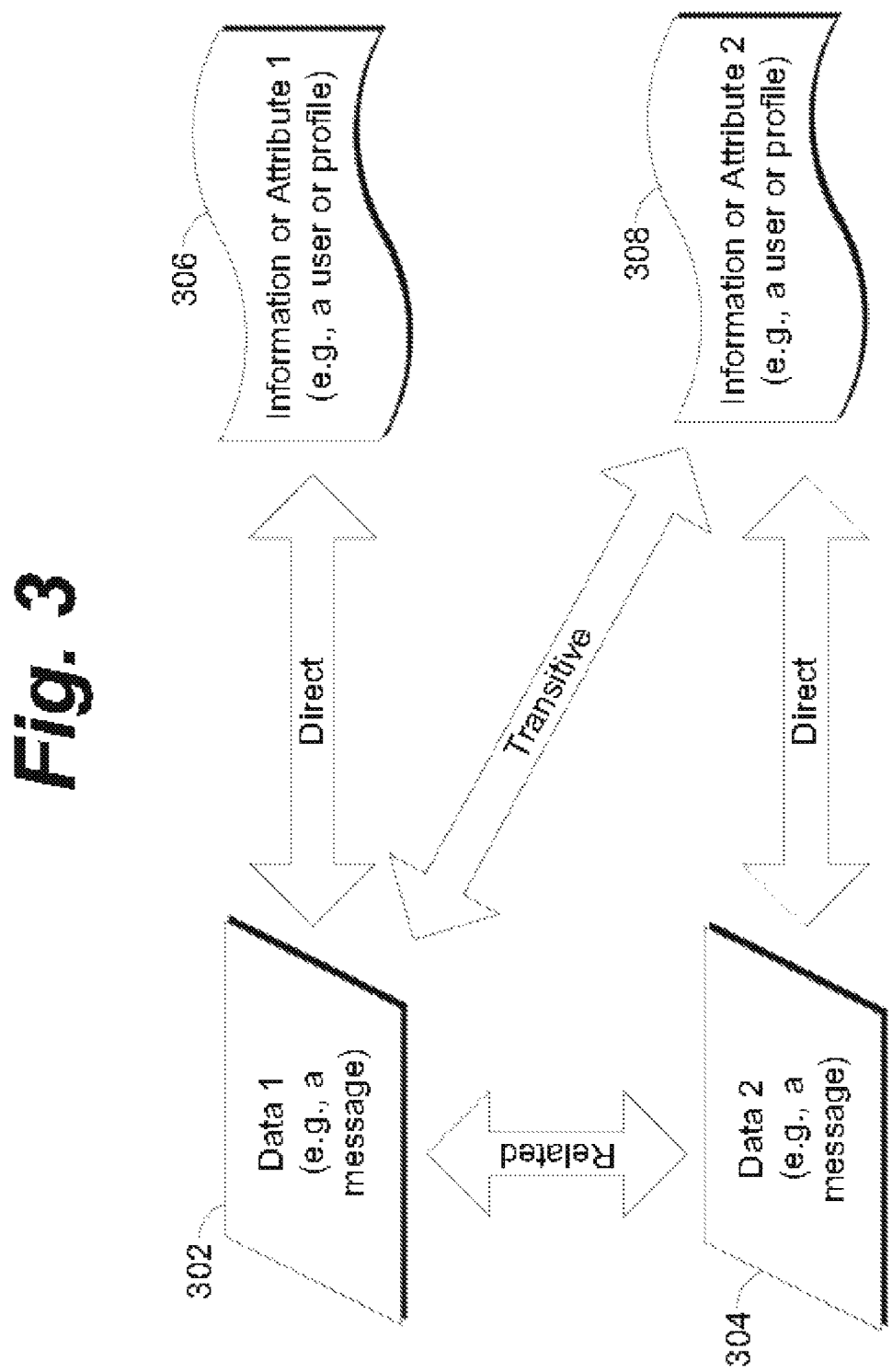
FIG. 3 illustrates relationships between pieces of data according to one or more example embodiments of the present invention.

The analyzer(s) 204 may track a variety of types of relationships between pieces of data. FIG. 3 shows an example representation of types of relationships between pieces of data. The analyzer(s) 204 may track, for example, direct and transitive relationships between pieces of data. As can be seen in FIG. 3, the analyzer(s) 204 may analyze a first piece of data 302 and a second piece of data 304. The first piece of data 302 (e.g., a message) may be associated with some first piece of information or attribute 306 (e.g., a user or profile), and the second piece of data 304 (e.g., a message) may be associated with some second piece of information or attribute 308 (e.g., a user or profile). The analyzer(s) 204 may track, for example, the direct relationship between the first piece of data 302 and the first attribute 306, as well as the direct relationship for the second piece of data. The analyzer(s) 204 may also track the transitive or indirect relationship between the first piece of data 302 and the second piece of data 304. The analyzer(s) 204 may track a hierarchical relationship between pieces of data. For example, a piece of data could be related to a parent or child piece of data, or it could be related to a sibling piece of data. Other relationships may be tracked as well.

The analyzer(s) 204 may build up one or more data models (e.g., referred to as "Data Modeling") from the data from one or more source devices, for example, using information from one or more correlation intensity algorithms and, optionally, one or more other tools, such as filters. The analyzer(s) 204 may include other information in a data model, for example, access controls and/or other rules associated with the data. The analyzer(s) 204 may communicate one or more data models and/or other data or information to one or more data stores 210, for example one or more cloud data centers.

A data model may include one or more "data globs." A data glob may refer to a cluster or block of data and various other related pieces of information or attributes related to the data. A data glob may contain data in various forms, for example, structured data, unstructured data, both structured and unstructured data, communications data or other form of data. A data glob may include multiple pieces of data content, related users, relevant access rules and the like. As one example, a data glob may include a block of messages, including the content of the messages, related profiles, times, access rules and the like. Each data glob may store information about the data glob, information similar to metadata, for example a name, a description, a unique identifier and the like. Data globs may reside in a database, for example, a communications database or some other form of database, and/or a cloud data center, either in a relatively centralized manner or data globs may be stored in a distributed fashion, for example, with different parts of the data glob being stored on different servers. Data globs may be easily interacted with. For example, data globs, as a single unit, may be capable of being moved, copied, filtered, searched, processed, synchronized, split, merged, modified, analyzed and the like.

Data globs may be reusable, in a manner similar to the way objects are reused in object-oriented programming. For example, multiple data globs may be assembled into a larger piece of data, which may constitute a new data glob. One efficient approach to using data globs may be to reuse as much of an existing data glob as possible, changing only details that differ from the data glob being used. For example, when a new data glob is created using an existing data glob, much of the existing data glob may be useable, and extra and/or different data may be added to the data glob to create a new data glob. In this respect, the DRSP 200 may analyze the content inside of a data glob as opposed to just treating a data glob like a black box. This manner of reusing portions of existing data globs to create new data globs, optionally with some additional or different information, may be referred to as "integration." In some embodiments of the present disclosure, the DRSP 200 may include an integration tool that may manage existing data globs and utilize existing data globs to create new data globs. The integration tool may use as much data from existing data globs as possible, for example, to make data storage and access as efficient as possible.

Referring to FIG. 2, the analyzer(s) 204 and/or the manager 206 may build data globs. The analyzer 204, the manager 206 or some other component may run statistical analysis on data globs, for example to determine counts of types of data, attributes and the like, or to create lists or other statistics. Data globs may be designed or programmed in an Agile-style data model that allows dynamic analysis of data. Each data glob may go through a data lifecycle, meaning it may go through an iterative, incremental, adaptive and/or evolutionary development process, for example, where contents, relationships and other information about or in the data glob evolve through user interaction, development of related information and the like. Thus, data globs may be flexible and quickly responsive to change.

One or more data stores 210, for example one or more cloud data centers, may accept data from the analyzer(s) 204, for example, in the form of one or more data models. Data store(s) 210 may be large and scalable, for example, consisting of one or more servers and/or data storage devices. Data store(s) 210 may, optionally in conjunction with manager 206 and/or other components of the DRSP 200, store data, correlations and/or other information in a manner that the data is "kept alive," meaning the data is readily accessible and manageable.

Data store(s) 210 may be implemented in a big table manner. For example, data store 210 and/or one or more components of the DRSP 200 may utilize a database architecture that is designed for distributed, scalable, big data store (for example, a Hadoop database program such as HBase). One or more components of the data relationships storage platform (DRSP) 200 may include code, methods, routines, components and the like that utilize and/or interface with the database software program. As one example, these methods, routines, code, components and the like that utilize and/or interface with the database software program may be referred to as the database management program, and as one example, the database management program 212 may be part of the manager 206, as shown in FIG. 2. It should be understood that in other embodiments, the database management program 212 may be located, run and/or executed as part of other components, or may be part of the data store 210. The database management program 212, optionally in conjunction with another database software program, may adapt the DRSP 200 and the data store 210 to allow random, real-time read and writes to access large quantities of data, for example, data that may represent data models, and correlation information as discussed herein.

The database management program 212 may have unique keys and/or key-value pairs that may interface with other database software programs. A key-value pair (KVP) is a set of two linked data items: a key, which is a unique identifier for some item of data, and the value, which is either the data that is identified or a pointer to the location of that data. Key-value pairs are frequently used in lookup tables, hash tables and configuration files. The keys may facilitate searching the data store 210 for information related to data correlation information. One or more of the unique keys may be associated with one or more of the components (or "data primitives") of the DRSP 200. The DRSP 200 may also dynamically synchronize row keys with the ability to tag the data associated with the row keys. The row keys may include information such as the timestamp when the record was published or captured, a unique sequence of bytes determined from the content of the record and a code indicating the length of the key and its assigned content type.

An example embodiment of a row key is a sequence of binary octets (bytes) that may comprise five fields—seed, timestamp, padding, type, and length. The seed, length and type are mandatory. The seed may be 0, but must be there. In one or more embodiments, the timestamp and padding are optional, but at least one of the timestamp and the padding (or another uniquely defined value) must always be present. If the timestamp cannot be guaranteed to make the record unique because other records of the same type may have the same timestamp in a particular system, then some padding may be used. Typically the padding is 16 bytes. In one or more embodiments, the record row key may comprise: a seed represented by 1 byte, a timestamp represented by 8 bytes, a padding represented by 16 bytes, a type represented by 2 bytes, and a length represented by 1 byte. To represent these 28 bytes it takes a 56 character ASCII string.

The first (i.e. most significant) byte may be the seed byte. The purpose of the seed is to avoid long sequences of records being written at the same time due to a stream of incoming data. A random or "pseudo-random" sequence of seed values may be generated by selecting either one of the least significant bytes of the time stamp field (described below) or the padding field (also described below). This random or pseudo-random choice improves the write throughput of the system by distributing the records across different region-servers. This avoids the phenomenon of "region-server hotspotting" where data is written to the same part of a storage system multiple times in succession. The next field may be the timestamp field. This field is normally derived from the date at which the record was published. It is the milliseconds elapsed since the start of the Java epoch (midnight on Jan. 1, 1970 using Universal Standard Time.) This field is always 8 bytes. The next field is an optional padding field. It can be used for a number of purposes, the most significant of which is to differentiate records that occur at the same instance of time. The value of this field may be programmatically derivable from the contents of the record, by, perhaps, using the value of a tag where that tag is known to be a unique value for each record (say an IP address, or some kind of UUID, or a URL, or a hash of the important fields.) The width of the padding field can be defined via the RecordKey API—part of the SDK. The type field is a two-character code corresponding to the type of the Record. See Table 1 below for a list of record type codes. The final field is the total number of bytes in the row key, as an integer value.

TABLE 1

| RecordType | Code |
|---|---|
| UNKNOWN | "aa" |
| ANALYZER_LOG | "al" |
| ATTACHMENT | "at" |
| BLOB | "bb" |
| BLOG | "bg" |
| BULLETIN | "bn" |
| COLLECTOR_LOG | "cg" |
| COLLECTOR_LOG_AGGREGATE | "ce" |
| CSV | "cv" |
| EMAIL | "em" |
| ERROR_LOG | "el" |
| FACEBOOK | "fa" |
| FILE | "fi" |
| KEY_FINGERFIELD | "kf" |
| KEY_FINGERPRINT | "kp" |
| KEY_NUMERIC | "kn" |
| KEY_SIGNATURE | "ks" |
| LINKED_IN | "li" |
| NEWS | "ne" |
| PHONE | "ph" |
| PROFILE | "pr" |
| QUERY | "qy" |
| RSS | "rs" |
| SEARCHRESULT | "sr" |
| SQL | "sq" |
| TEXT | "te" |
| TWITTER | "tw" |
| WEBCONTENT | "we" |

The database management program may also implement one or more transaction management routines. As one example, a transaction management routine may include a transaction isolation routine, for example, a "read committed" routine. In general, an isolation routine may refer to a routine that locks a data field in a database while some other service or request accesses data in the database. For big data, various isolation routines have disadvantages, for example, because they may continuously lock portions of the database, making access difficult. In one or more embodiments of the present disclosure, a transaction management routine may perform several database operations near the same time (e.g., reads and writes) and may synchronize the data at a later time. In one or more embodiments of the present disclosure, a transaction management routine may lock the database narrowly, when locking is necessary, as to not lock out other transactions.

Referring to FIG. 2, manager 206 may communicate with one or more data stores 210 or cloud data centers to manage the data stored therein. Manager 206 may analyze data in the data store(s) 210 to ensure it is live and accessible. Manager 206 may analyze data in the data store(s) 210 to determine new or changed relationships between the data, for example, comparing existing data to newly added data. Manager 206 may run one or more algorithms that are similar to the algorithms explained above with regard to the analyzer 204, for example, a correlation intensity algorithm to determine whether relationships exist and/or the intensity of correlations between data. In some embodiments, one or more algorithms used by the manager 206 to analyze the data in the data store 210 may be the same algorithms as used by the analyzer 204. Manager 206 may implement one or more version control algorithms and/or routines that analyze data in the data store(s) 210 to determine whether data is current. Version control algorithms and/or routines may replace old data or may designate new data as the most relevant data while archiving old data.

The user interface/visualizer 208 may provide an interface between users and/or source devices that interface with the DRSP 200. The user interface/visualizer 208 may provide visual feedback (for example, via various visualization screens or displays) to a user such that the user can see the data and correlation information stored in data store 210. The user may then interact with the user interface/visualizer to explore, analyze and manipulate data and correlations or relationships between data, as well as other information like statistics. The user interface/visualizer 208 may allow a user to interact with the data and relationships in real time, and receive quick responses. Various configurations of components, communication links, code, routines and the like may exist in the DRSP 200 in order to implement analysis and management commands communicated between a user and the data store 210. One example configuration is shown in FIG. 2 where the user interface/visualizer 208 is in communication with the manager 206, and the manager then communicates with the data store 210. Tag discovery may be visualized in a user interface. The user interface may extract tag statistics out of query results. The user interface display may be automated and may illustrate conceptual groupings. Comparison timelines may also be visualized in a user interface. A timeline layout may allow for a visual comparison of two complex queries.

Figure 4:
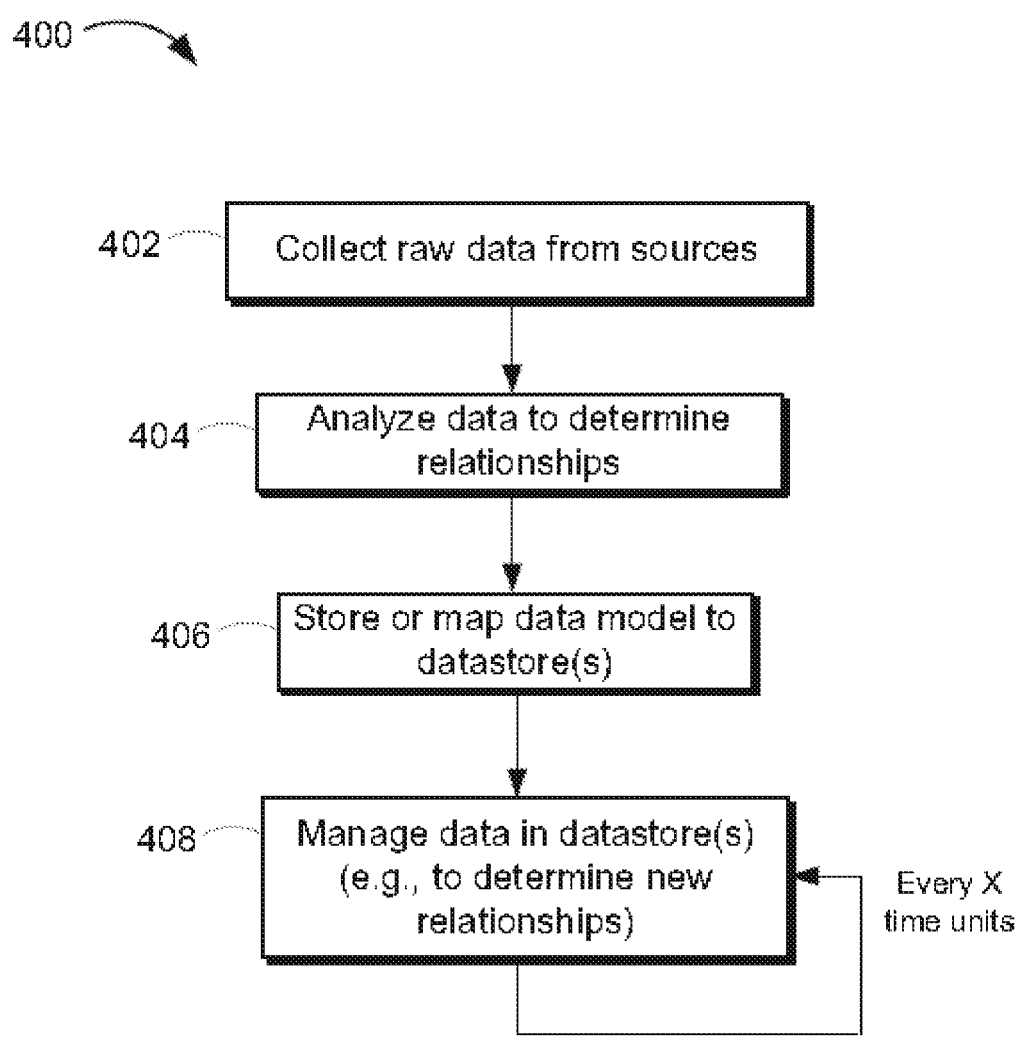
FIG. 4 is a flow chart of operations on raw data in a DRSP according to one or more embodiments of the present invention.

Certain embodiments of the present disclosure may be found in one or more methods of operating a data relationships storage platform. FIG. 4 depicts an illustration of a flow chart 400 showing example steps in a method of operating a data relationships storage platform, according to one or more example embodiments of the present disclosure. It should be understood that, in some embodiments, one or more of the steps depicted in FIG. 4 may be performed in a different order than depicted. Additionally, in some embodiments, a method of operating a data relationships storage platform may include more or less steps than are depicted in FIG. 4. Specifically, FIG. 4 depicts an example import process for a data relationships storage platform. At step 402, the data relationships storage platform may collect raw data from a variety of sources, for example using one or more collectors as explained above. At step 404, the data relationships storage platform may analyze data to determine whether relationships or correlations exist in or between the data, and optionally, the intensity of the relationships. Step 404, may utilize one or more analyzers as explained above. At step 406, the data relationships storage platform may store or map one or more data models (including data correlations) to one or more data stores or cloud data centers. At step 408, the data relationships storage platform may continually execute one or more routines to manage data in the data store(s), for example to determine new relationships. Step 408 may use a manager and/or a database management program similar to the ones described above. As one example, step 408 may include executing one or more management routines at regular time intervals.

Figure 5:
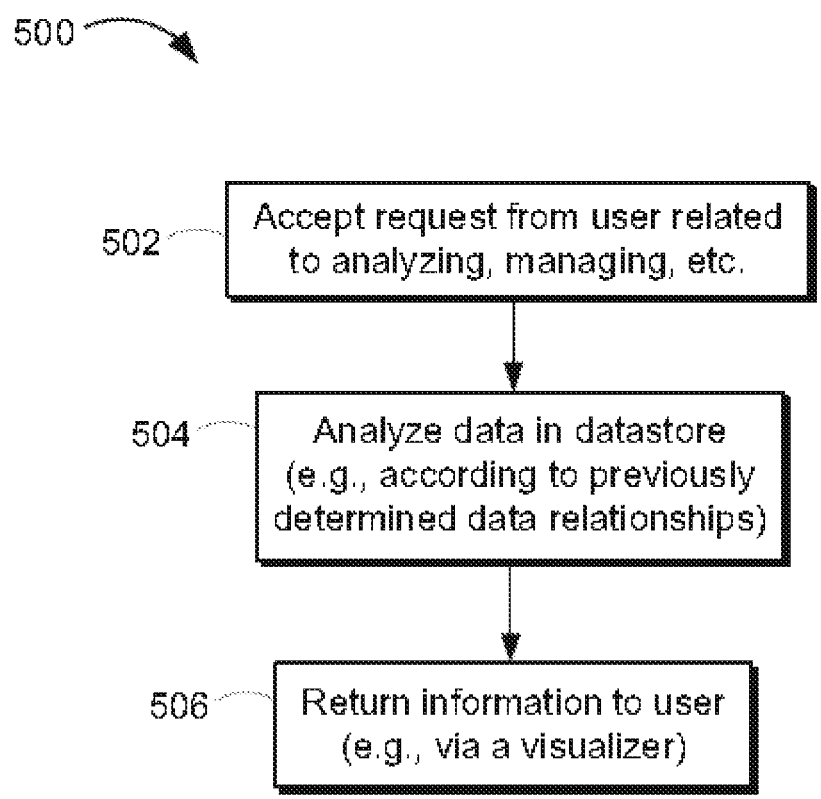
FIG. 5 is a flow chart of operations on previously stored data in a DRSP according to one or more example embodiments of the present invention.

FIG. 5 depicts an illustration of a flow chart 500 showing example steps in a method of operating a data relationships storage platform, according to one or more example embodiments of the present disclosure. It should be understood that, in some embodiments, one or more of the steps depicted in FIG. 5 may be performed in a different order than depicted. Additionally, in some embodiments, a method of operating a data relationships storage platform may include more or less steps than are depicted in FIG. 5. Specifically, FIG. 5 depicts an example analysis or management process for a data relationships storage platform. At step 502, the data relationships storage platform may accept a request from a user or source device indicating that the user or source device is attempting to analyze, explore, manipulate or manage data in the data store. At step 504, data relationships storage platform may communicate with the data store to analyze data in the data store, for example, according to previously determined data relationships. At step 506, the data relationships storage platform may return information to the user related to the user request. The data relationships storage platform may utilize various visualizations (e.g., a screen and/or displays) to communicate with a user, for example, at steps 502 and 506.

Early and late binding in compilers and interpreters refers to deferring final assignment of the location of variables in memory until the application is actually loaded into the memory of the system in which it is executing. Early and late binding may allow for decisions about the placement of items to be deferred allowing more flexibility in assembling a system from its components. Early and late binding may also allow the program to be reconfigured in the light of its context or use. The term "late-solution-binding" as applied to data management extends early and late binding such that the metadata associated with the data may be changed (e.g., added, deleted, modified) even after data that has been imported into the system and stored. Therefore, the "solution" (e.g., analytics or business purpose) for the data may be modified or re-used without re-loading the data.

The data store architecture (e.g., as illustrated in FIG. 2 as the data store 210) is the primary storage platform that may be used at an API level. Within the data store architecture data may be broken down in a process of denormalization. Once data is in the data store, it may get keyed, indexed, sorted, etc. This is an example of late-solution-binding, wherein the data store may index and understand data while leaving it where it lives.

An example enterprise application development process may include: domain specific application development; cross-industry application development; well defined problem and well defined data; and/or data architecting application development. The data architecting application development may require: heavy IT; heavy analysis; batched collection and ingestion cycles; data architecture that changes on the fly without disrupting existing apps; virtualized globs; denormalization into primitives; ongoing collection; indexing; incremental changes; iterative experimentation; and/or ingestion application development.

Example objectives of the data store architecture may include: a long term, durable data storage system that is "future-proof"; a once-on, always-on, never-off system that may be upgraded without restart; allowing data to be re-used and re-purposed without extensive re-work of the storage system; the ability to capture the raw data from a wide range of sources; a flexible mechanism to allow this data to be analyzed and "hidden" relationships exposed; a tiered access software developer kit (SDK) allowing users to build flexible and targeted applications—both simple and complex (e.g., using REST, Java, Spring); data globs that can be shared, mutated and distributed; RBAC; object based ACL; and/or an extensive range of industry data collectors that can be used import data from wide range of sources.

The data store architecture may allow asynchronous and consistent data collection. The data store architecture may transform all forms of data into a common form. The relationships between the concepts stored in data may be called a data model. A data model describes the ways in which concepts within the data are accessible to users and applications. The type of data model may be: Hierarchical, Network, Relational, Entity-Relationship, Anchor Model, Dimensional, Multi-value, and/or Object, Key-Value. The actual data may be stored in a database that may not necessarily directly map to the data model. A database may represent the way in which data is actually stored. The data model may represent a higher level of abstraction of the data in the database. The performance of a specific data model may be optimized by producing special implementations of databases, with enhanced performance for that specific data model.

The data in the data store may be categorized as structured, semi-structured or unstructured. These terms may refer to the nature of the data format/data type employed. Unstructured data may refer to information that does not have a pre-defined data model and does not map to an existing database schema—or at least, no schema available to the application. There may be several elements of a model that are just blocks of text or markup (such as HTML). Embedded in this data there may be dates, numbers, HTML links, etc. Because of the lack of structure, it may be difficult to analyze relationships in unstructured data. Unstructured data may frequently be inconsistent. The source of unstructured data may significantly change the format of the returned data over time.

Semi-structured data may refer to a form of data that does not conform to the formal structure of various data models associated with relational databases or other forms of data tables, but nonetheless contains tags or other markers to separate semantic elements and enforce hierarchies of records and fields within the data. Semi-structured data may also be referred to as schema-less or self-describing structured data. For semi-structured data, the entities belonging to the same class may have different attributes even though they are grouped together, and the attributes' order may not important.

Structured data may refer to data that conforms to a well-known schema, for example, in the form of tables with many rows of strongly-typed columns. The table descriptions may be inflexible. Structured data may be easily analyzed (e.g., by a software program) because the semantics and attributes of the data are known before analysis starts. Any changes to the schema may be time-consuming and may require extensive systems work to implement in a large organization. It may be difficult for a system to keep up with the continuously changing requirements, which may be a feature of modern enterprise IT.

Data consistency may refer to the requirement that repeated operations produce consistent results, for example, read operations. A system may be said to be "Read Consistent" when writes and reads follow a causal relationship. In other words, every read reflects the latest write. With very large amounts of data, and very high update rates, maintaining consistency can become a major performance problem. Thus, it may be common in semi-structured data systems to relax the rules of strict read consistency and accept that there may be a delay in reading updates. Highly structured databases may be designed to comply with the ACID rules: Atomicity, Consistency, Isolation, and Durability.

The data store architecture may be designed to store descriptions of data structures—not store data structures themselves. The data store architecture may focus on communications (i.e. messages) and people (i.e. profiles), bringing together messages, profiles and blobs (see more details about "blobs" as described herein). The data store architecture may tag data (e.g., all data types). These tags may be searched, compared, created. The use of tags may simplify the management and analysis of new business data, for example, by working with concepts that can be used to build huge stores of information that may be rapidly and effectively mined for their business value. This provides great value since modern business communications may continually generates new business data.

The DRSP may implement a special kind of data model that enhances operations such as the retrieval of time-ordered relationships inherent in things such as business communications or other communications, and may organize the entities represented by that data model in a flexible and accessible way. The data model may combine aspects of the entity-relationship model with some features of the anchor model. The data model may be built upon a key-value store. Some embodiments may use HBase, although the present disclosure contemplates the use of other key-value stores, or an RDBMS.

Various embodiments may implement a concept of a "message store." In various communications, the fundamental unit of data is the message. A message may have the following properties: a source; a sender; a timestamp; one or more pieces of information; one or more intended recipients; and various pieces of metadata. The source indicates where the message came from, for example, an email system, or a computer log file, or an RSS field. The timestamp indicates when the message happened. The one or more pieces of information (e.g., what the message is about) may depend on the message. In some embodiments, there must always be some kind of information, whether it's a simple piece of logging status, a telephone number or a full multipart MIME email message with attachments. Optionally, it may be possible to infer or report who appears to have actually received a message. Each message may be identified by a RecordType code, for example, RSS or TWITTER™ or FACEBOOK™ and this message code may be either fixed by the embodiment or a mechanism may be provided to allow the users of the system to create and modify new code types.

Elements of the data architecture may indicate important relationships between pieces of data. The principal elements may include: messages; profiles (e.g., senders, recipients, and observers); and blobs (or documents). The data architecture may include, optionally, other elements, for example: accounts, sources, relationships and annotations. These may be inferred from or describe aspects of principal elements.

A sender may be an entity who originates a message. In some embodiments, not all messages have senders, some messages have only sources. For example, if user A sends user B an email, user A is the sender of the message and the source is the email system that user A sent the message through. As another example and in contrast, an RSS feed may not be associated with a particular sender, but it is still the source of the message.

A recipient may be the intended destination of the message. Some messages may not contain a clearly defined recipient. It may not always be possible to infer a recipient, so the absence of a specific recipient does not imply the intention to make the message global ("public"). In some cases a recipient is clearly defined and in some cases the recipient can be inferred. Sometimes the recipient is "to whom it may concern" as in the example of a log. Occasionally, the recipient is global, for example in a Twitter™ message or a public RSS feed.

Observers may be profiles that may see the message pass, but are not the intended recipient. The data store may hold recipients and senders in a "Profile Store." A Profile may refer to an entity, for example, an individual or an organization or even a particular computer. In some embodiments, senders, recipients and observers are all examples of profiles. In some embodiments, a profile may be a principal element, for example, because it is represents the interaction of messages with profiles, and this interaction may be critical to the understanding of the data flow process. Profiles may contain references to accounts.

An account may include a set of credentials used to access a resource. For example, an email account may include the name of the mail server and the user name and password together with any other information required to access the mail server.

One challenge faced by designers of systems to collect business information, particularly from third-party sources, may be that the nature of the messages changes, for example, between sources and over time. The ability to observe and record these changes may be very useful to create an improved data store. Various data stores may apply tags. A tag may refer to a "named property". A tag may include a name and a value. A tag may have a type, for example, indicating what kind of value is stored in the tag. Tags may be added, modified or removed from any item or element stored in a data store. Tags may be a useful component in building a flexible and evolving semi-structured data model. A tag may be associated with a message or profile or blob or other data element. Messages, profiles, documents (blobs), and perhaps other data elements may each be tagged. In various embodiments, tags may: 1) have values that are searchable as text; 2) be generated by running analyzers on the data store and updating existing objects with more metadata; 3) be used in non-text search and analysis operations; and 4) be user-defined. Tags may also be applied in bulk. There are mechanisms to group and count tag contents and these tag-grouping mechanisms may be a standard, or extended by a developer SDK.

Giving a user or group of users the ability to create and manage metadata tags may allow multiple parties from multiple domains to share a single system. This allows multiple users to apply tagging to data records without needing to cooperate on the naming conventions and taxonomy of the tags. Each user or group of users may designate their metadata tags as "private" (visible to a given signed-in user), "shared" (visible to several users), or "global" (visible throughout a domain). The domain may be a virtual domain on a server between multiple companies.

Each user can have one or more of the following roles: tag reader—someone who can see tags; tag creator—someone who can generate new tags; tag writer—someone who can update tag values; tag deleter—someone who can remove existing tags; and/or tag editor—someone who can write and/or change the type of the tag. Additionally, users can be members of groups that share a common privilege or a certain set of privileges, but where only some members of the group are allocated certain other privileges. Thus, the marketing group may "own" tags that its members can all see, but only certain members can delete those tags or change the contents, and the ability to create new tag names in that space may be restricted to only one or two users.

Each user and each group may be mapped to a specific table, for example, in the HBase store. Associated with each table is a relational database that manages the roles and privileges for each tag that has scope for that table. This mechanism allows for users to share visibility of tags with other users and groups, but retain control over the name and values of the tags.

Managing tags may comprise: isolating the visibility of tags and tag contents to individuals/groups; accessing a control mechanism to create, modify, and delete tags; providing tag usage statistics; providing tag utilities (e.g., auto-completion of tags); and providing Record Type management utilities. Tagging may require that each user be identified to the system. For operations that involve tags, a check may be made to see that the operation is allowed on the intersection of the tag and user, and the user's tags may be stored in specific user tables.

Tags may be named such as [<domain>.]<user>@<tag>. A "tag" may be a piece of metadata that can be attached to a record. Usually, such pieces of metadata are small. A tag has a name, and that name is unique within a tag's namespace. By default, the namespace of a tag is that associated with a particular user.

A tag may have a type. The user may or may not have the permissions that allow the type to be changed. If the type is changed for such tags, the system will attempt to 'coerce' the current value of the tag to the new type. If the coercion fails (e.g., trying to convert a tag with a value of 'Fred' to a numeric tag will fail, but a string tag with a value of '10' will succeed) then the user is warned that the tag conversion failed.

The store can be organized into 'domains.' A domain is associated with a domain path (like a reverse URL without the scheme, or a Java package) (e.g., com.bitvore). The domain path must be unique. By default, each domain has associated with it a ROOT table. This ROOT table is the table into which records will be collected for that domain. Each domain also automatically has associated with it a root user—a member of the root role—which has every possible permission (a super user).

Tag operation types may include: creating, modifying, deleting, viewing, searching, controlling access permissions, and obtaining information. Each user is assigned a role, for example, analyst, or developer. The system administrator is provided with a number of default roles, but may create/edit additional roles. Permissions may include, but are not limited to: create record; store record; index record; delete record; list records; view record; create tag; delete tag; modify tag name; modify tag contents; change tag type; view tag; create a user; delete a user; modify a user; create a role; delete a role; modify a role; add a user to a role; remove a user from a role; list user's groups; list user's permissions; list users; modify user's permissions; create query; search add job; list jobs; delete job; set job privilege level; run job; run admin job; and update job. A role is a collection of permissions. Each user is assigned one or more roles.

The operation of the data store may be controlled by three separate databases: a User Profile Database (UPD); a Tags Management Database (TMD); and a database to store the tags (e.g., a specific HBase table/store). The UPD contains a list of users, email addresses, passwords and permissions. Each user is uniquely identified by a Primary Key field in the database.

The TMD contains the names of all of the tags in the system and their corresponding owners. Each tag has a name and an owner. There is also a tag permissions table, which is a cross-reference to all the users and tags in the system, with one entry for each user/tag together with a permissions mask to show how a user can access that tag. If there is no entry for a particular user, then that tag name will be 'invisible' to the user. Since a user may create their own tags without the knowledge of another user also creating a tag with the same name, and then they can change the permission on their version of that tag such that the other user can see it we need a set of rules governing that situation. The TMD also contains tag usage information such as the number of occurrences of the tag in the store, and the number of different values that that tag has (but not the values—that may be held in the HBase table.)

The specific HBase table stores the tags that each user owns. All indexing operations will need to be in the individual index stores. At the inception of an operation there will need to be a determination of which users are relevant to that operation. Types of operations may include: storing tags, indexing tags, adding tags, removing tags, changing tags, changing tag ownership, deleting tags, and searching tags.

The tag name is known in a search. Each user may have a unique search index. The TMD (tag manager database) may be queried for a list of user's where the specified tag has read access. This will return a list of tables that have appropriate access. For each table there may be a search index, so the search can be issued against the corresponding search readers.

A domain has a list of users. One user is the super user—and one user is always given ADMIN role privileges. ADMIN role privileges may be a subset of the super user privilege set. The ADMIN user can add/delete users, create/delete groups.

By default, collectors and analyzers are created with the ROOT privilege level if they are created as ADMIN type analyzers. If they are regular COLLECTORs/ANALYZERs invoked by a user, then they are loaded by the user, unless the ADMIN elevates the run-level for that analyzer or unless the user has "Job Elevation Privileges." Regular users may not run ADMIN analyzers. Different instances of the same collector/analyzer code may need to run at different privilege levels—by default, this can be done when the collector or analyzer is launched if the authenticated user doing the launch has that privilege level.

Actions that would result in the mutation of the object controlled by the privilege may trigger an error report if there are attempts to violate privileges. Searches, retrievals and list operations should simply silently skip privileged content. The counts from search results are coded such that information is not disclosed inadvertently.

The Tag Usage Stats API may support queries that return: the tags owned by a user; the number of occurrences in the system of a specific tag owned by, or visible to, a specific user; the number of different values that a tag owned by, or visible to, a specific user; and the array of values in the system of specific tags owned by, or visible to, a specific user.

The tag value map will be an data record. Every time a tag is created or a modified value is the first occurrence of a new value, a new value map entry may be created and the instance count set to 1. Every time a tag is deleted or its value modified, the instance count is decremented. When the instance count is 0, the tag value is removed from the value map. The value map key may be of the form: <value-type-code><is-hash><value-or-hash>, where the <value-type-code> may be set to 'D,' 'L,' 'B,' 'K,' or 'H'; the <is-hash> may be set to 'Y' or 'N'; and <value-or-hash> may be up to 32 characters padded by spaces or 0's representing the value. Boolean true comes out as 'true' for example.

Tag entry may use an auto-complete function. As a user types in tag name proposals, the system will return a list of tags. There need to be two options—'owned by' and 'visible by'. The option of 'owned by' returns only those tag names that the user owns (thus are in their namespace). The option of 'visible by' will return a list of qualified tag names where the current user also has visibility of those tags in other namespaces.

Record types may be allocated at compile time—in other words, are completely defined at build time. Alternatively, a database table of record types may be used to allow the addition of record types in operation. By default, the record types table may be pre-populated with a number of types that cannot be modified or deleted. A system administrator may be able to add additional types, where the type names follow rules such as: 1) type names must be all uppercase ASCII characters in the set A-Z, 0-9, _ to a maximum of 24 characters; and type names must be unique within a given domain.

After a record type has been created, it cannot be deleted until every record of that type in the domain or user tables for that domain has also been deleted. Where records are imported from another system and the type name is not recognized, it may be replaced with a randomly generated type name of the form @UNKNOWN_nnnnnnnnnnnn . . . n (the same random name is used for all of the same type from the same system.) The type name will be unique for each imported domain. The administrator will be able to edit this type at will.

In some embodiments, the final form of a data stored may be a BLOB (Binary Large OBject) or a document. A blob may be a collection of bytes (8-bit binary numbers, or octets). A blob may represent data which is not a message and not a profile. Blobs may or may not be searchable. In some embodiments, all blobs have a MIME type, which may be used to identify the kind of information stored in the blob. Blobs, similarly to messages and profiles also may have: a unique identifier, a timestamp, a row key, the actual contents of the blob or a reference to the actual contents, a hash (e.g., message digest).

Messages may refer and relate to blobs or documents (e.g., attachments or in the body of the message).

Figure 6:
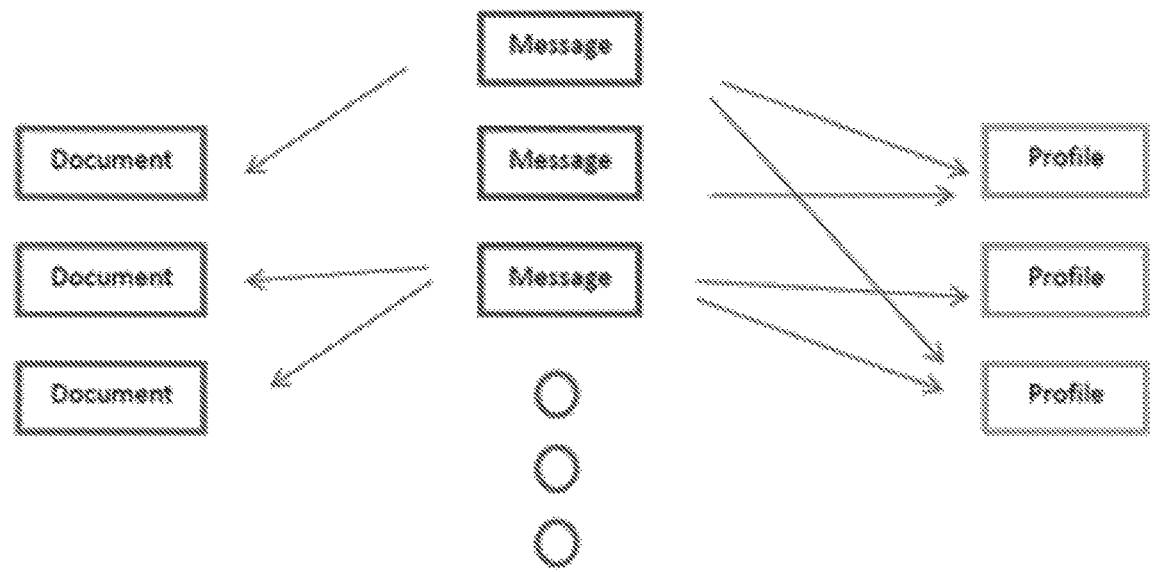
FIG. 6 is an example illustration of the relationships between messages, profiles and documents according to one or more example embodiments of the present invention.

FIG. 6 illustrates how the three primary elements (e.g., messages, profiles and blobs or documents) of the system relate to each other. FIG. 6 shows one example and is not intended to be limiting. FIG. 6 is not intended to show any particular technique (such as UML).

Retrieving information from the data store efficiently and effectively may be important. A search feature may be available through an API (e.g., a REST API). A programmatic software client search API may be available for developers. This may be written in a programming language such as Java, but other languages may be used. Search results may be paged and organized into groupings. The mechanisms that may be used to search the data store include, but are not limited to: indexed search of text elements, such as message bodies and tags with character content; distributed processing tasks using Map/Reduce technology to scan very large numbers of records quickly; and/or relationship search using semantic relationships or other relationships identified by previously run analyzer jobs. The programmatic API may provide a schema-less import of data (e.g., data can be imported regardless of its format or data model).

The search mechanisms above may be combined on demand or dynamically, for example, a search might be constructed to find all the records of type TWITTER and type EMAIL sent between Jan. 21 2011 and Feb. 19 2012 with a positive sentiment and originated in San Mateo where the email messages belong to the same thread and contain the profile of the sender of the Twitter™ feeds. (This example may assume that the IP addresses of messages were analyzed and geographic locations were identified.)

Some embodiments may create trending reports which may show ways that events change over time, for example, the growth or decline of sentiment within a particular family of search results or where there are specific profiles or profile types involved.

The blob store may be used as an archival repository. The blob store may keep fingerprinted records of binary objects and as such may be used as a traceable archive store. Metadata associated with the objects may allow the identification of the creator and sender of the data.

Figure 7:
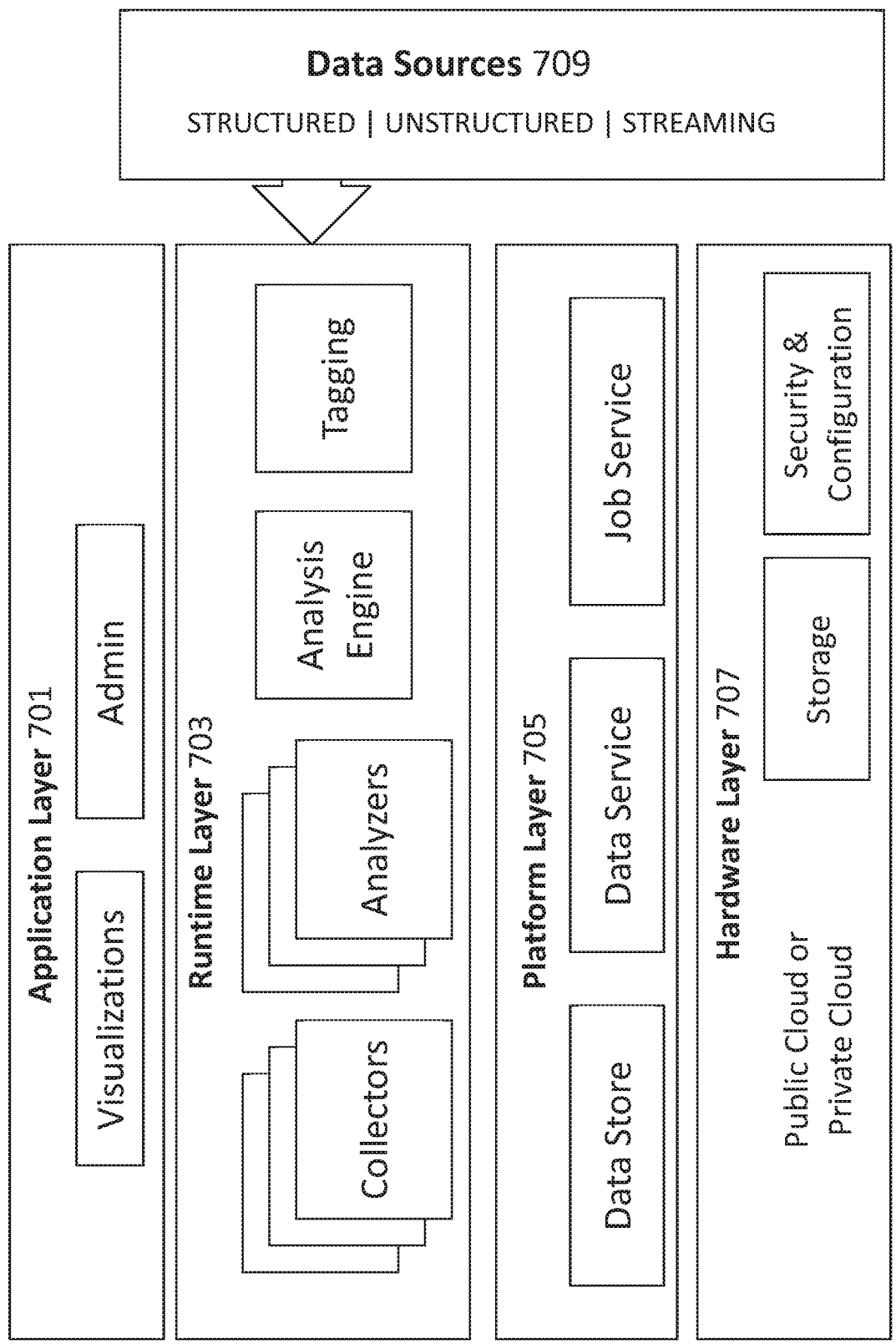
FIG. 7 shows the protocol layers of a storage platform in accordance with one or more example embodiments of the present invention.

FIG. 7 shows the protocol layers of a storage platform in accordance with one or more example embodiments of the present invention. A storage platform according to the present invention may include an application layer 701, a runtime layer 703, a platform layer 705, and a hardware layer 707.

The application layer 701 may comprise visualizations and administrative applications. Visualizations include user interfaces to visualize the relationships hidden in the data—e.g., timelines relating messages and profiles. The administrative applications include user interfaces to provide mechanisms to configure and set access controls on the system.

The runtime layer 703 may comprise collectors, analyzers, an analysis engine and tagging functionality. Collectors connect to one or more data source 709 and periodically scan/ingest messages. A collector may be a mechanism for scanning a source of data. In some embodiments, collectors have a reference to a source, for example, a URL pointing to an RSS field. Collectors may be managed by a Job Service. A collector's main purpose may be to process the incoming source and identify messages which are then saved in the data store. Analyzers may be distributed processing engines that run on the nodes of the data store. An analyzer may be a process managed by a Data Service that processes records in the data store. Analyzers may have the following roles, by way of example and not limitation: to identify relationships between elements in the system; to create new elements by scanning data in the system; to annotate with metadata (tags) existing elements; and to determine elements that should be removed, disabled or hidden. The analysis engine may be the central component of the data analysis and may be a framework to co-ordinate the activity of several analyzers.

Each time a collector runs, it may generate two messages that can be used to monitor the overall data collection status. The first message may be the Collector Start Event. This event may be generated as soon as the collector starts executing. The second message may be the Collector Completion Event. This may be generated when the collection process has completed (e.g., either normally or with an error) and may contain the results generated by that run.

The following are example flows of data through a system/storage platform, by way of example and not limitation: Collecting data from an RSS feed; Collecting Apache HTTP log data; Collecting PST email from an archive file.

Data may be imported/collected/ingested with "Collectors." Each collector can be triggered by time. Various SDKs may allow customers to: build their own analyzers and collectors; build analysis work flows; and create their own visualizations of the data stored in the data service.

The platform layer 705 may comprise the data store, the data service and the job service. The data store is a cloud-based highly scalable data storage system. The data store is where the data is stored. The Data Service is a Web service that interacts with client applications to expose the data store. The Data Service may be a process that manages reads and writes to and from the underlying data store, and also may provide number of administrative functions. The Job Service is a Web service used to manage collectors, analyzers and/or other processes. The Job Service may manage the Collectors and Analyzers and schedule when Jobs are run on them. The Job Service may be configured with triggers to define when the collector runs. Example triggers include: repetitively, one-time, on-demand (triggered from UI), or on-an-event.

Components of one or more embodiments may include, for example and not limited to, the following: one or more analyzers, collectors and web services that allow the management and action of these collectors and analyzers. Analyzers may come in many different forms and examples include, but are not limited to, adding modifying and replacing tags, adding modifying and removing records, adding, modifying or removing other analyzers, adding modifying and removing collectors and importing and exporting records in different forms (although the import function may be shared by collectors). Collectors may come in many different forms and examples include, but are not limited to, collecting from HTTP sources such as web sites and RSS feeds, collecting from web service APIs such as Twitter™, Facebook™, Dropbox™, LinkedIn™, Salesforce™ and similar, and collecting from other APIs such as Java Database Connectivity SQL databases, Internet Mail protocol servers (IMAP) and FTP servers. Also collectors may import other file formats such as comma-separated files (CSV), Microsoft Outlook data files (PST) and others.

The Analyzer mechanism may schedule and analyze jobs and use job service to maintain schedules. The Analyzer Service may schedule jobs with the job service; pass trigger information to an analyzer to actually run; turn around and make call backs to invoke an analyzer; and handle mapping between collectors and analyzers. Some analyzers may be triggered to run when a collector finishes, e.g., a PST collector may be configured such that a thread analyzer and profile analyzer will run. A "cross-message" type threader may launch a whole series of analyzers that are run. Jobs may be concurrent, map-reduce jobs or centralized jobs. Analyzers may run asynchronously and can be dynamically loadable and/or role-restricted. A reporter may be used to retrieve data. The reporter may run on demand or may be scheduled using the job service. The reporter may be implemented in a pre-processor for programmatic or user interface access. The reporter may collect and assemble pre-calculated results from analyzer runs. For example, to compare one complex query from last week's data to this week's, each search may take 20 minutes, and then you would still need to merge and compare the results. The reporter may condense known queries for any time granularity, to take a few tenths of seconds.

An Analyzer Service REST may be the Web based API for controlling analyzer services. A Configuration Service is a data storage that holds configuration information for the rest of the components. The Configuration Service may be used to share configuration information such as the list of analyzers or collectors that are available and configured into system. The Configuration Service may also be used to share information on how Hbase system may be setup and what systems may be involved. A Data API may be the underlying Java based API implementation for accessing key-value pairs and doing queries, and managing what's going in and out of the data store. A Data Service may be the actual mapping onto the storage system resources and the management of transfer of data between the users, applications, and machines. A Data Service REST may be the Web based API for data service. An HBase Client may be the entry point for access to the underlying HBase store, which is a point where storage can be swapped from in-memory to cloud-stored file formats. A Job Service may be a set of functions to maintain, schedule and invoke services, like analyzers and collectors.

An Admin Analyzer may backup and restore records to and from ZIP files. A Validation Administrator may check and repair record integrity. A De-Duplication Analyzer may identify records that return similar information and should be hidden from particular view. A Discovery Analyzer may build new collectors from existing record content. An Analyzer Builder Analyzer may build new analyzers from existing record content. An Entity Analyzer may perform Entity Name Recognition and tag records with additional metadata. An Index Analyzer may re-index records following format changes. A Profiles Analyzer may identify references to individuals and build profiles for them. An Email Thread Analyzer may identify email message threads and link to the profiles that created them. A Record Administrator may delete selected records identified by tags. A Sentiment Analyzer may be a 3-value sentiment analyzer which labels individual blobs or messages as negative, neutral or positive or some other quality/attribute. A Stats Analyzer may perform statistical operations on the values of tags or the number and/or types of records. A Table Definition Analyzer may perform bulk tagging operations defined by a database table that is entered and modified by a user. A Tagger Analyzer may add, remove or update tags on records that match a specific query. A Web Link Analyzer may be employed to find links to web pages in record tags and collect these as new records.

A Bing™ Search News Collector may be used to collect news feed data from the Microsoft Bing Service. The Bing™ Search Web Collector may also be used to collect records identified by a web search using the Microsoft Bing Service. A Bridge Collector may allow the import of sets of records filtered by queries from one Bitvore system to another. A CSV Collector may be used to import content from comma-separated value files (CSV). A Twitter™ Collector is a Twitter™ structure-smart component that imports, filters, and incrementally downloads data from a specific Twitter™ account in a compliant manner. A Facebook™ Collector is a Facebook™ structure-smart component that imports, filters, and incrementally downloads data from a specific Facebook™ account in a compliant manner. A Wget Collector may be a generic download manager for grabbing unstructured data and may pull down unstructured content using HTTP, HTTPs, FTP content. An RSS Collector may be the component that goes out, understands and incrementally grabs RSS feed data from a specific Web address. An IMAP Collector may connect to an Internet Mail Protocol server and retrieve records for one or more email accounts. A Web Content Collector may connect to a remote HTTP site and retrieve the contents of this site. The Web Content Collector may also generate multiple records and may perform authentication, authorization and content filtering and transformation if required. An SQL Collector may connect to a standard SQL database, execute queries and save the resulting data to the datastore as records.

There may be additional services and support components ("libraries") to provide common services and capabilities to the analyzers, collectors and web services. These may include a Common Library that may contain general code shared by many projects; an Email Common that may contain code specific to components dealing with email messages; a Search Common that may contain code used to parse, build and execute content searches described by VQL ('Vore Query Language') queries; and a Web Collect Common that may provide code used in components that access web services such as HTTP and HTTPS servers.

Data stored in a data store may form objects or records. The intrinsic properties of a record may allow it to be identified (e.g., by means of a key). In some embodiments, each record may have an associated "master" table. Records may be classified or sub-classed to handle common usage patterns (e.g., message, profile, blob etc.) Data stored in a data store may be created and/or accessed according to various access patterns. Example access patterns include: Create, Fetch, List, Delete, Search, and Analyze.

Messages may consist of a collection of tags. If a message exists already, it may be important to avoid creating a duplicate of exactly the same message. When a message is inserted into a data store, each tag of that message may be checked to see if an identical message exists. If so, then the new message may be discarded. The fact that the message was collected and discarded may be recorded in the collector logs. This process of checking whether a message already exists in the data store may be called fingerprinting. Fingerprint tables may be used to track changes to records and/or track the messages' origins or other attributes of the messages.

Tags may be fingerprinted individually; thus, a coarse level of similarity comparison may be available. For example, it may be possible to search for the number of matching tags that the various records in the data store have by using fingerprint tables. Thus, records with a high degree of similarity may be identified. In some embodiments, by way of example and not limitation, some tags can be marked as "don't care" during the similarity matching.

Data records in the system (e.g., CoreMessage and Core-Profile) may be semi-structured data. A data record may include metadata and may include a set of tags. In some embodiments, the number and type of tags is not fixed, and different sources will add different tags to the core records. Some sources may repeatedly re-scan the same data sources.

A fingerprinting system may be used to identify records which have already been stored and make calculated determinations as to whether a new record should be created, or an old record re-used/replaced. A fingerprint may include a list of finger fields. Each finger field may map to a tag, and may be the tag or a standard field from the record (such as the body). A finger field may include a name or field name, which may be (e.g., by convention) the tag name prepended with the tag type (e.g., DOUBLE.sentiment). A finger field may include a hash (e.g., the SHA-1 hashcode) of the contents of the tag.

Figure 8:
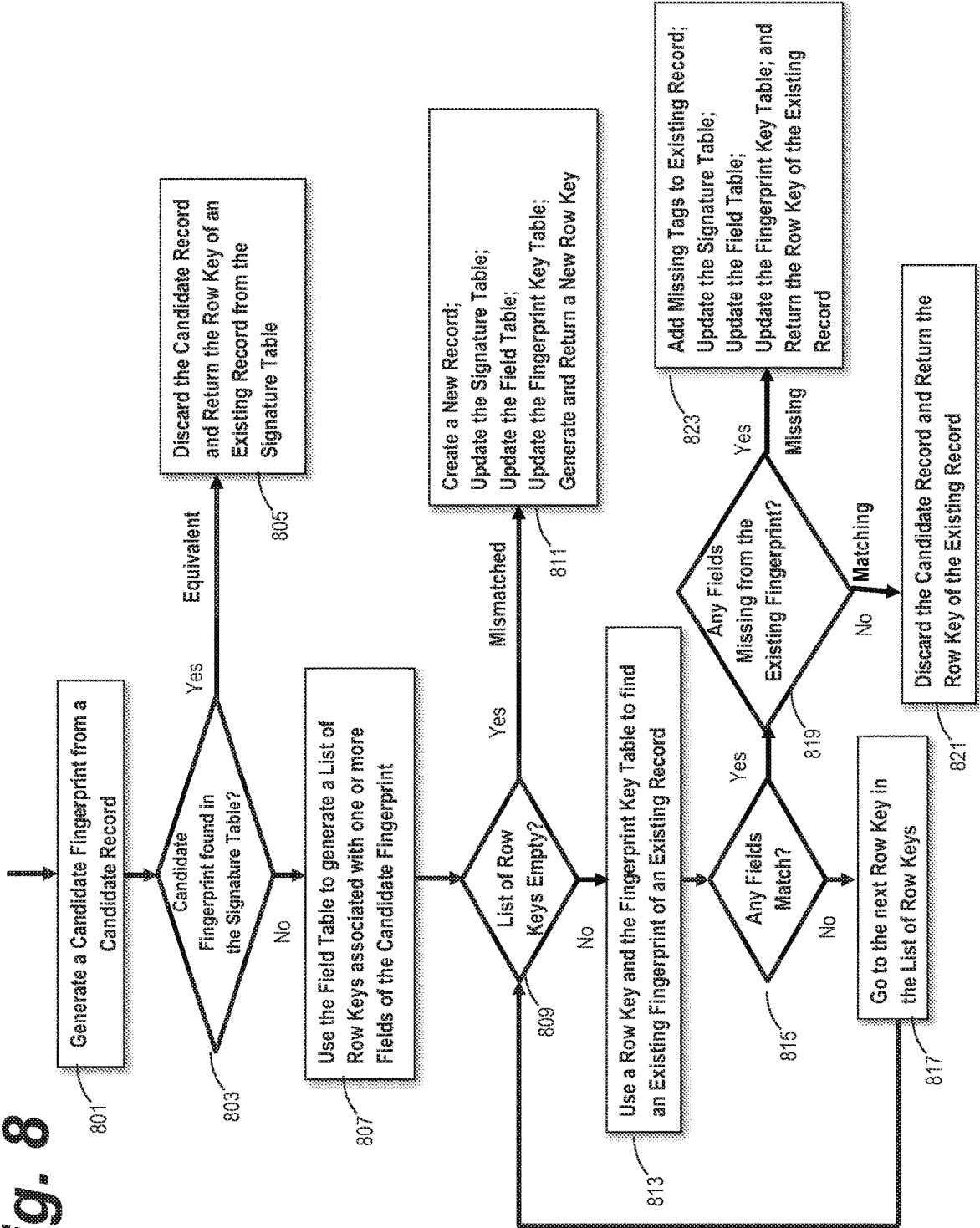
FIG. 8 is a flow chart of an example algorithm for processing a newly added record in accordance with one or more example embodiments of the present invention.

FIG. 8 is a flow chart of an example algorithm for processing a newly added record in accordance with one or more example embodiments of the present invention. First, create the fingerprint of the new record 801 and check to see if the signature table has an exact match 803. If so, this is the equivalent case 805, and the row key from the signature table is returned. For each finger field of the candidate, scan the fieldTable looking for exact matches (name+hash value) which are related to other records. Generate a matching list of fingerfields+record row keys (e.g., see FieldTableValue class).

The fingerfields may be grouped by row key (e.g., a reverse map of the generated result). The fingerprint from the fingerprint key table may be determined and scored against the candidate. If there are any results that are matching, they are added to the 'matching list' (matching). If there are any results that are missing, they are added to the 'missing list' (missing). If (missing.isEmpty and matching.isEmpty), a new record is created by returning the candidate row key.

If missing.size>0, the tags that were missing from the existing records but are in the new record are identified and submitted to the tag additions queue. The row key of the existing record is returned.

If matching.size>0, the candidate has less fields than the existing, so the row key of the existing record is returned.

A finger field may generate a row key. A fingerprint may include a row key, which may correspond to the record for which the fingerprint was created. A fingerprint may include a signature, which may be an overall hash of all the fingerfields (e.g., excluding a hash of the fingerprint's row key). The algorithm used to identify and return fingerprints may use the design of big table systems such as HBase.

At 807, the field table is used to generate a list of row keys associated with one or more fields of the candidate fingerprint.

If the list of row keys is empty at 809, the record is mismatched. As a result a new record may be created and a new row key may be generated and returned at 811. Additionally, the signature table, the field table, and the fingerprint key table may be updated at 811.

If the list of row keys is not empty at 809, the record is either matching or missing. The row key and the fingerprint key table may be used to find an existing fingerprint of an existing record at 813. If no fields match at 815, go to the next row key in the list of row keys, 817.

If at least one field matches at 815 and there are no missing fields at 819, the candidate record is matching. As a result, the candidate record is discarded and the row key of the existing record is returned at 821.

If at least one field matches at 815 and there are missing fields at 819, the candidate record is missing. As a result, the missing tags may be added to the existing record and the row key of the existing record returned at 823. Additionally, the signature table, the field table, and the fingerprint key table may be updated at 823.

Figure 9:
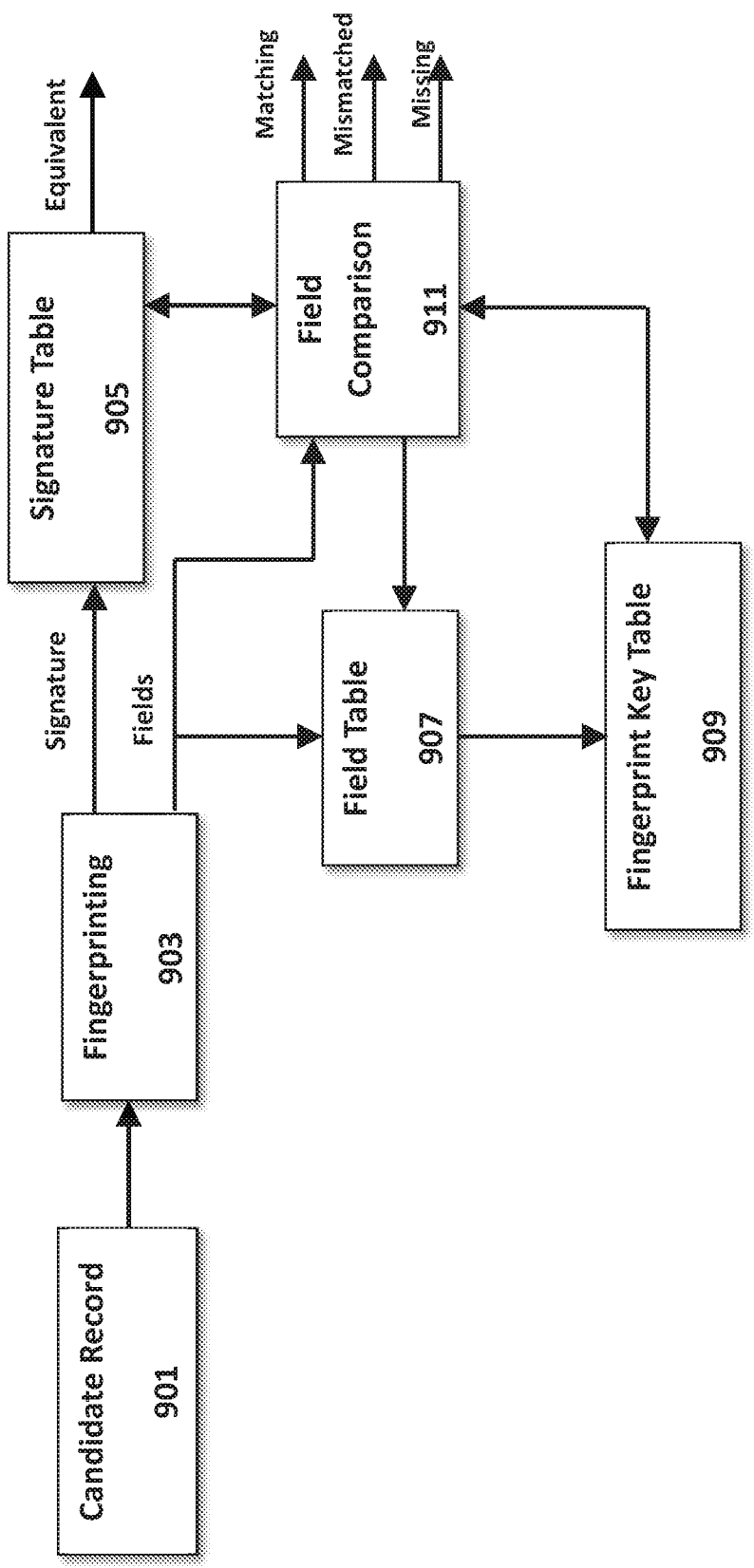
FIG. 9 is a block diagram of an example algorithm for processing a newly added record in accordance with one or more example embodiments of the present invention.

FIG. 9 is a block diagram of an example algorithm for processing a newly added record in accordance with one or more example embodiments of the present invention. Various components may be used in the fingerprinting system. A "signature table" 905 may refer to a map of a fingerprint's signature to the row key of the record with that signature. A "fingerprint key table" 909 may refer to a map of the row key to the fingerprint for that row. A "field table" 907 may include a row key comprising the hash of the field+MD5 hash of the row key of the record and points to the (type-qualified) name of the finger field (e.g the original tag) (e.g., DOUBLE.sentiment or META_BODY.body).

In FIG. 9, the candidate record 901 is fingerprinted by a fingerprint generator 903. The signature is evaluated with respect to the signature table 905 to determine whether an equivalent record already exists. In the equivalent case, first and second records share the same number of finger fields, and each finger field has the same corresponding hash.

If an equivalent record does not already exist, a field comparison 911 is performed. For the comparison, the fields of the candidate record are passed to the field table 907. The collections of fields for existing records are mapped by the fingerprint key table 907.

The following describes various example cases showing characteristics and relationships between two records, a first (e.g., candidate) and second (e.g., existing) record. In the matching case, the first record has N finger fields and second has M finger fields, where M>N. The N finger fields in the first (candidate) record are the same (e.g., name+hash) as the finger fields in the second (existing) record, which also has additional finger fields not contained in the first record. In the mismatched case, both first and second have corresponding finger fields with the same name, but different hashes. They may have other fields, but any field that the both have in common can trigger mismatch. The case where M is said to be in the missing state is when the first record has N finger fields and second has M finger fields, where M<N. The M finger fields in second are the same (e.g., name+hash) as finger fields in first, which also has additional finger fields.

As an example, when a record is added to a data store, the rules shown in Table 2 below may be implemented, e.g., when considering the candidate against each existing record. The new record may be referred to as the candidate (e.g., similar to the "first" record above). Each record in the data store may be referred to as an existing record (e.g., similar to the "second" record above).

TABLE 2

| Comparison | Action |
| --- | --- |
| equivalent | discard the candidate and return the row key of the existing record |
| matching | discard the candidate and return the row key of the existing record |
| mismatched | create a new record and return the row key of the new record |
| missing | return the row key of the old record, but add the missing tags to the old record and update the fingerprint accordingly |

Figure 10:
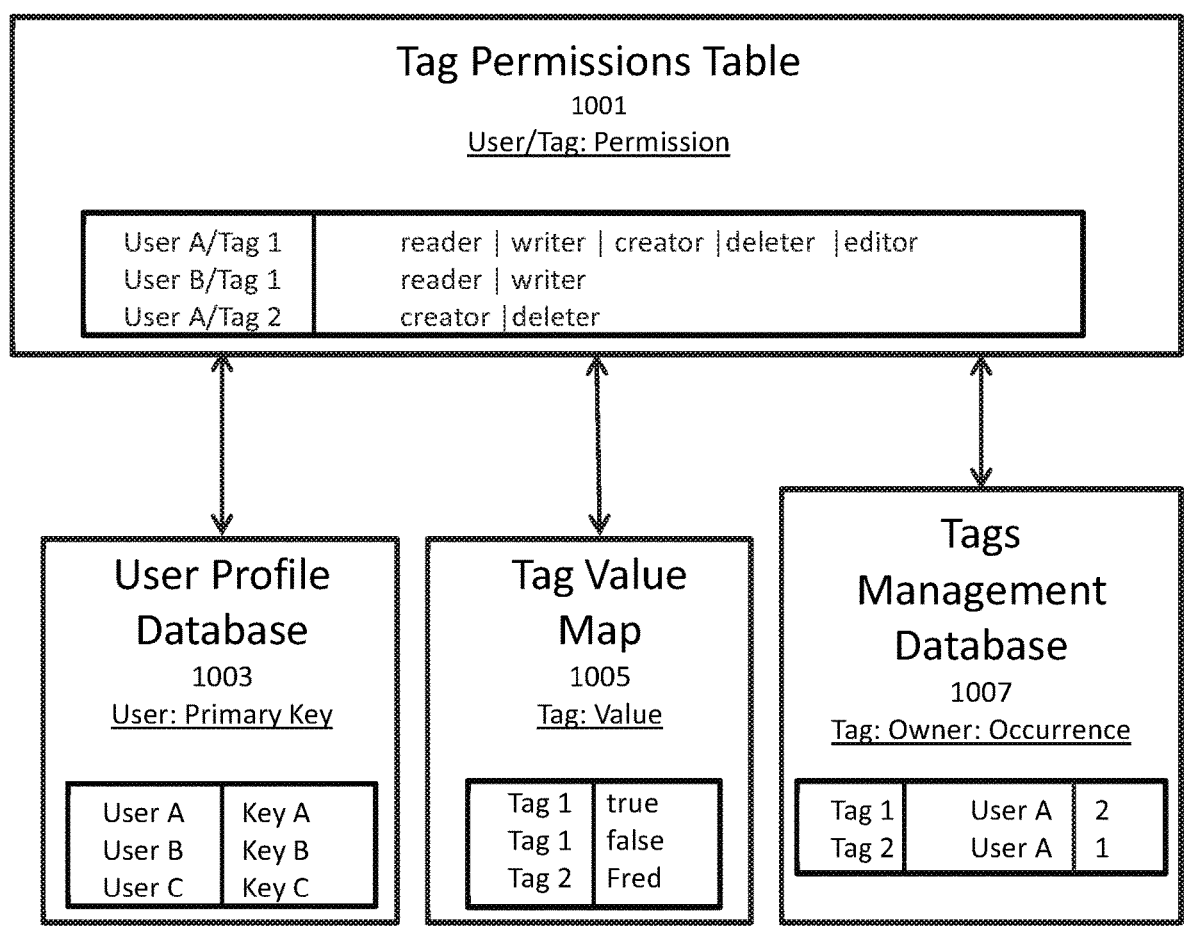
FIG. 10 is a block diagram of an example system for controlling tag generation in accordance with one or more example embodiments of the present invention.

FIG. 10 is a block diagram of an example system for controlling tag generation in accordance with one or more example embodiments of the present invention. The system comprises a User Profile Database (UPD) 1003; a Tags Management Database (TMD) 1007; a Tag Permissions Table (TPT) 1001; and a Tag Value Map (TVM) 1005.

The UPD 1003 contains a list of users, email addresses, passwords and permissions. Each user is uniquely identified by a Primary Key field in the database. For example, User A, User B and User C may be uniquely identified by Key A, Key B and Key C, respectively.

The TMD 1007 contains all the names of the tags in the system. Each tag has a name and an owner. In the example in FIG. 10, Tag 1 and Tag 2 are both owned by User A. The TMD 1007 may also contain tag usage information such as the number of occurrences of the tag in the store, and the number of different values that the tag has. In the example in FIG. 10, Tag 1 has two different values and Tag 2 has one value.

The TPT 1001 is a cross-reference to all the users and tags in the system, with one entry for each user/tag together with a permissions mask to show how a user can access that tag. In the example in FIG. 10, User A may create, edit, delete, read and write Tag 1; User B may only read and write Tag 1; and User A may create and delete Tag 2. If there is no entry for a particular user, then that tag name will be 'invisible' to the user. For example, Tag 2 is invisible to User B; and Tags 1 and 2 are invisible to User C.

The tag values are held in the TVM 10. In the example in FIG. 10, Tag 1 may have a true value or a false value; and Tag 2 can take the value 'Fred.'

The present disclosure may be embedded and/or embodied in a program, which comprises all the features enabling the implementation of the embodiments described herein, and which when loaded in a computer system is able to carry out these embodiments. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A non-transitory computer-readable medium storing computer-readable instructions, the instructions, when executed by a processor of a terminal device, produce a data processing system, comprising:
    a collector operable to collect data pieces from one or more data sources;
    an analyzer operable to determine relationship information among the data pieces, the relationship information comprising a degree of correlation between two or more data pieces;
    a fingerprinting system operable to produce a fingerprint, wherein the fingerprint comprises a list of fields mapped to one or more tags related to a data piece of the collected data pieces; and
    a data relationships storage platform operable to decentralize a storage of the analyzed data pieces by distributing a data glob to one or more big-data databases for storage, the data glob comprising one or more of the data pieces, one or more fingerprints and the relationship information, wherein the distributed data glob is modifiable and searchable.

2. The data processing system of claim 1, wherein the analyzer is operable to use an intensity algorithm to determine the degree of correlation among the data pieces.

3. The data processing system of claim 1, wherein the data relationships storage platform is operable to use one or more data services to manage the communication of the data globs to the big-data databases.

4. The data processing system of claim 1, wherein the collector is operable to de-normalize the data pieces.

5. The data processing system of claim 1, wherein the analyzer is operable to track the number of data pieces received and the number of data globs created.

6. The data processing system of claim 1, wherein the analyzer is operable to add one or more tags to the data pieces, wherein the tags are searchable in the big-data databases.

7. The data processing system of claim 1, wherein each data piece represents a message with one or more of the following fields: source, sender, timestamp, subject, intended recipients, actual recipients and metadata.

8. The data processing system of claim 1, wherein each data piece is associated with one or more profiles, where each profile is one of a sender, a recipient and an observer.

9. The data processing system of claim 1, wherein the data processing system is programmed to identify related source-profiles in order to determine a single profile for each unique person.

10. A data relationships storage platform, comprising:
    a fingerprinting system operable to produce a fingerprint, wherein the fingerprint comprises a list of fields mapped to one or more tags related to a data piece of the collected data pieces; and
    a big-data database communicatively coupled to a data processing system that is communicatively coupled to one or more data sources,
    wherein the big-data database decentralizes a storage of one or more data globs received from the data processing system,
    wherein the data globs comprise data pieces from the one or more data sources, one or more fingerprints and relationship information, the relationship information correlating how two or more of the data pieces relate to each other,
    wherein the relationship information is generated by the data processing system, and
    wherein the one or more stored data globs are modifiable and searchable.

11. The data relationships storage platform of claim 10, wherein the big-data database keys, indexes and sorts the data globs when the big-data database stores the data globs.

12. The data relationships storage platform of claim 10, wherein the big-data database tags the data globs when the data globs are stored, and wherein the big-data database is operable to search and compare the stored data globs.

13. The data relationships storage platform of claim 10, wherein the big-data database is operable to be searched by a user, where the search is based on one or more of the following: content of data pieces in data globs, tags, and relationships.

14. The data relationships storage platform of claim 10, wherein the big-data database uses the fingerprinting system to ensure that duplicate copies of the same data piece are not stored in the big-data databases.

15. The data relationships storage platform of claim 10, wherein the big-data database includes one or more of the following big data tools: Hadoop, Hbase or Elastic Search.

16. The data relationships storage platform of claim 10, wherein the big-data database communicates with one or more of the following:
    a query and analysis module;
    a big data analytics module; and/or
    one or more custom applications that allow users to interface with the big-data database.

17. The data relationships storage platform of claim 10, wherein the relationship information comprises one or more editable tags, each tag is designated as being visible to a single user, visible to several users, or visible throughout a domain.

18. The data relationships storage platform of claim 10, wherein the big-data database organizes stored data globs by row keys.

19. The data relationships storage platform of claim 10, wherein the big-data database analyzes the data globs to determine one or more sentiment scores.

20. The data relationships storage platform of claim 10, wherein analyzing the collected data pieces includes de-duplicating collected data pieces according to a level of similarity the collected data pieces have with stored information associated with data globs in the big-data database.

* * * * *